(12) United States Patent
Taura

(10) Patent No.: US 8,072,522 B2
(45) Date of Patent: Dec. 6, 2011

(54) SOLID-STATE IMAGING DEVICE, IMAGING APPARATUS, AND ELECTRONIC APPARATUS

(75) Inventor: Tadayuki Taura, Kanagawa (JP)

(73) Assignee: Sony Corporation, Tokyo (JP)

( * ) Notice: Subject to any disclaimer, the term of this patent is extended or adjusted under 35 U.S.C. 154(b) by 787 days.

(21) Appl. No.: 12/120,405

(22) Filed: May 14, 2008

(65) Prior Publication Data

US 2008/0284885 A1 Nov. 20, 2008

(30) Foreign Application Priority Data

May 18, 2007 (JP) ................. 2007-132787

(51) Int. Cl.
 *H04N 3/14* (2006.01)
 *H03M 1/12* (2006.01)
(52) U.S. Cl. ...................... 348/300; 341/155
(58) Field of Classification Search .......... 348/300, 348/301, 294, 308, 297, 255; 341/155, 164, 341/165

See application file for complete search history.

(56) References Cited

U.S. PATENT DOCUMENTS

| | | | | |
|---|---|---|---|---|
| 5,920,274 A | * | 7/1999 | Gowda et al. | 341/155 |
| 7,129,883 B2 | * | 10/2006 | Muramatsu et al. | 341/164 |
| 7,623,173 B2 | * | 11/2009 | Nitta et al. | 348/302 |

OTHER PUBLICATIONS

W. Yang et al.; An Integrated 800x600 CMOS Image System; ISSCC99 Digest of Technical Papers; Session 17/Paper WA17.3; pp. 304-305; Feb., IEEE; 1999.

* cited by examiner

*Primary Examiner* — David Ometz
*Assistant Examiner* — Ahmed A Berhan
(74) *Attorney, Agent, or Firm* — SNR Denton US LLP

(57) ABSTRACT

A solid-state imaging device includes a pixel unit in which unit pixels are arrayed, a complementary-signal generating unit that generates two kinds of complementary signals having complementarity with each other on the basis of analog pixel signals read out from the respective unit pixels in the pixel unit, two kinds of complementary signal lines on which the two kinds of complementary signals are transmitted, a horizontal scanning unit that transfers each of the two kinds of complementary signals on the complementary signal lines, and a differential amplifying unit that receives the signals on the two kinds of complementary signal lines with differential inputs and compares the signals.

12 Claims, 16 Drawing Sheets

<FIRST CONFIGURATION EXAMPLE>

<SECOND CONFIGURATION EXAMPLE>

<FIRST PROCESSING EXAMPLE>

<SECOND PROCESSING EXAMPLE>

<FOURTH PROCESSING EXAMPLE>

<CONFIGURATION OF OUTPUT DRIVER AND OUTPUT CIRCUIT (BASIC)>

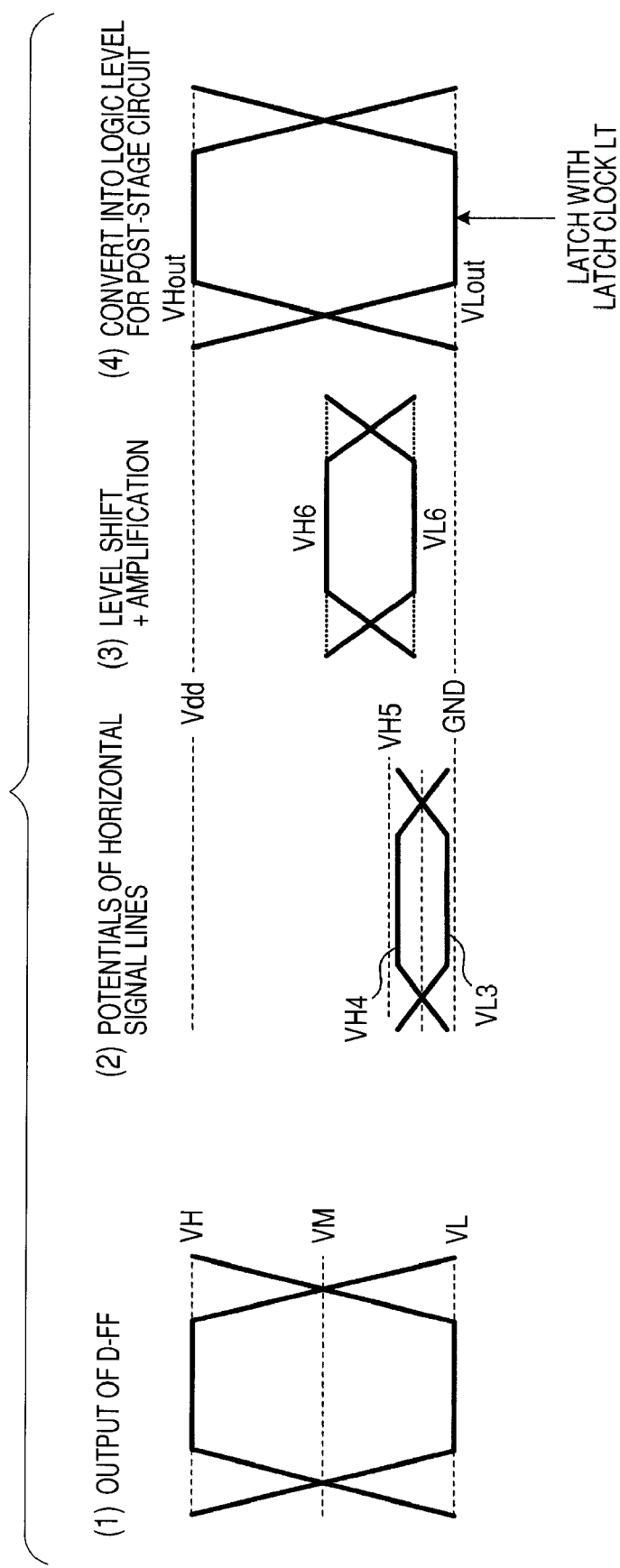

<COMPARATIVE EXAMPLE: TRANSFER ACTION>

<THIS EMBODIMENT: AMPLIFICATION AND TRANSFER ACTION>

(1) RELATION WITH THROUGH RATE (2) RELATION WITH DATA CHANGE

<WHEN BIAS LEVELS DO NOT COINCIDE WITH EACH OTHER>

SOLID-STATE IMAGING DEVICE, IMAGING APPARATUS, AND ELECTRONIC APPARATUS

CROSS-REFERENCES TO RELATED APPLICATIONS

The present invention contains subject matter related to Japanese Patent Application JP 2007-132787 filed in the Japanese Patent Office on May 18, 2007, the entire contents of which being incorporated herein by reference.

BACKGROUND OF THE INVENTION

1. Field of the Invention

The present invention relates to a solid-state imaging device that is an example of an semiconductor device for detecting a physical quantity distribution, an imaging apparatus, and an electronic apparatus, and, more particularly to a mechanism that sequentially outputs signals to other function units and to the outside (e.g., by horizontally transferring the signals).

2. Description of the Related Art

In the field of electric circuits, electric signals generated by a certain function unit are often sequentially transferred to other function units and to the outside (e.g., by horizontal transfer).

For example, a physical quantity distribution detecting semiconductor device configured by arraying plural unit elements (e.g., pixels), which have sensitivity to a change in a physical quantity of an electromagnetic wave inputted from the outside such as light or a radiation, a pressure (contact, etc.), or the like, in a matrix shape is used in various fields.

As an example, in the field of video apparatuses, a solid-state imaging device including an imaging element (an imaging device) of a CCD (Charge Coupled Device) type or a MOS (Metal Oxide Semiconductor) or CMOS (complementary Metal-oxide Semiconductor) type, which detects a change in light (an example of an electromagnetic wave) as an example of a physical quantity, is used.

In recent years, as an example of the solid-state imaging device, MOS and CMOS image sensors that can overcome various problems inherent in a CCD image sensor attract attention. In the field of computer apparatuses, a fingerprint authentication device and the like that detect an image of a fingerprint on the basis of a change in an electric characteristic or a change in an optical characteristic based on a pressure are used. These devices read out a physical quantity distribution, which is converted into an electric signal by unit elements (pixels in the solid-state imaging device), as an electric signal.

For example, the CMOS image sensor has, for each of pixels, an amplifier circuit configured by a floating diffusion amplifier and the like. In reading out a pixel signal, a system called a column parallel output type or a column type is often used. The column parallel output system or the column system is a system for, as an example of address control, selecting a certain row of a pixel array unit, simultaneously accessing pixels in the one row, and reading out pixel signals from the pixel array unit simultaneously and in parallel for all the pixels in the one row.

In the solid-state imaging device, a system for converting analog pixel signals read out from the pixel array unit into digital data with an analog-digital converter and then outputting the digital data to the outside may be adopted.

The same is true for the solid-state imaging device of the column parallel output type. Various signal output circuits have been devised as a signal output circuit for the solid-state imaging device. As an example of a most advanced form of the signal output circuits, a system that includes an AD converter for each of columns and takes out image information to the outside as digital data is considered (see, for example, W. Yang et al., "An Integrated 800×600 CMOS image system", ISSCC99 DIGEST OF TECHNICAL PAPERS, SESSION 17/PAPER WA17.3, pp. 304 to 305, February, IEEE, 1999 (herein after referred to as Non-Patent Document 1).

As the AD conversion system, various systems have been considered from viewpoints of a circuit size, processing speed (an increase in speed), resolution, and the like. As an example, there is an AD conversion system called a slope integration type or a ramp signal comparison type (in this specification, hereinafter referred to as reference signal comparison type) for comparing an analog unit signal with a so-called ramp-like reference signal (a ramp wave), a value of which gradually changes, for converting the unit signal into digital data, performing count processing in parallel to this comparison processing, and acquiring the digital data of the unit signal on the basis of a count value at a point when the comparison processing is completed. In the Non-Patent Document 1, a configuration example adopting the AD conversion system of the reference signal comparison type is disclosed. Analog outputs from pixels can be subjected to AD conversion in column parallel in a low band. It can be said that this is suitable for an image sensor that realizes both a high image quality and high speed.

SUMMARY OF THE INVENTION

However, when information on pixels based on image signals obtained from unit pixels is outputted to a post-stage (in general, referred to as horizontal transfer), a parasitic capacitance present in signal lines for horizontal transfer (information transfer paths: in particular, referred to as horizontal signal lines) poses a problem. When a capacitance value of the parasitic capacitance increases, the parasitic capacitance is more likely to cause a signal delay and prevents an increase in speed of information transfer.

For example, when a high-speed operation is performed for, for example, increasing a frame rate, it is necessary to perform operations such as row scanning and horizontal transfer at high speed. When AD conversion is involved, it is necessary to perform the AD conversion at high speed as well. When it is desired to increase speed of the horizontal transfer during the high-speed operation, time until an information output stage of a column designated by column address selection drives the horizontal signal lines and information of the column reaches a circuit at a post-stage is predominant.

When the column parallel output type is adopted, information output stages for pixel columns in the horizontal direction are connected to the horizontal signal lines. Parasitic capacitances of the respective information output stages are combined to form an overall parasitic capacitance C. A line resistance R due to the length of the horizontal signal lines as the information transfer paths increases depending on the number of pixels columns. The information output stage of a selected column is driven with the large parasitic capacitance C and the large line resistance R as loads. The parasite CR limits transfer speed of pixel information. In recent years, since there is a request for an increase in pixels, the number of information output stages connected to the horizontal signal lines tends to increase. This limits a high-speed operation particularly requested in recent years.

Therefore, it is desirable to provide a mechanism that sequentially transfers and outputs signals to other function units and to the outside of a device and can transfer the signals at high speed.

According to an embodiment of the present invention, there is provided a solid-state imaging device including a complementary-signal generating unit that generates two kinds of complementary signals having complementarity with each other on the basis of analog pixel signals read out from respective unit pixels of a pixel unit, two kinds of complementary signal lines that transmit the two kinds of complementary signals, a horizontal scanning unit that transfers the two kinds of complementary signals on the complementary signal lines, respectively, and a differential amplifying unit that receives the signals on the two kinds of complementary signal lines with differential inputs and compares the signals.

Frankly speaking, the solid-state imaging device has a characteristic in that, when pixel information is horizontally transferred, the pixel information is transferred as two kinds of complementary signals having complementarity with each other and the original information (or information equivalent thereto) is reproduced by the differential amplifying unit at a post-stage.

The solid-state imaging device may be formed as one chip or may be a module-like form having an imaging function formed by collectively packaging an imaging unit and a signal processing unit.

The embodiment is also applicable to an imaging apparatus. In this case, the imaging apparatus obtains an effect same as that of the solid-state imaging device. The imaging apparatus refers to a camera (or a camera system) or a portable apparatus having an imaging function. "Imaging" includes not only capturing of an image during normal camera photographing but also fingerprint detection and the like in a broader sense.

According to another embodiment of the present invention, there is provided an electronic apparatus including two kinds of complementary signal lines that transmit two kinds of complementary information having complementarity with each other, a scanning unit that transfers the two kinds of complementary information on the complementary signal lines, respectively, amplifying units that amplify the two kinds of complementary information on the two kinds of complementary signal lines, respectively, and a differential amplifying unit that receives the respective signals amplified by the amplifying units with differential inputs and compares the signals.

Frankly speaking, the electronic apparatus has a characteristic in that, when information is transferred, the information is transferred as two kinds of complementary data having complementarity with each other and original data is reproduced by the differential amplifying unit at a post-stage. In particular, the electronic apparatus has a characteristic in that the amplifying units are interposed between the complementary signal lines and the differential amplifying unit and the amplitude on the signal lines side is set small and the amplitude on an input side of the differential amplifying unit is set large.

According to an embodiment of the present invention, pixel information is transferred as complementary signals and reproduced by the differential amplifying unit at the post-stage. Therefore, even if noise is mixed in signals on the signal lines, the influence of the noise can be cancelled. As a result, it is possible to perform high-speed transfer.

According to another embodiment of the present invention, digital data is transferred as complementary data and reproduced by the differential amplifying unit at the post-stage. Therefore, even if noise is mixed in signals on the signal lines, the influence of the noise can be cancelled. The amplifying units are interposed between the complementary signal lines and the differential amplifying unit and the amplitude on the signal lines side is set small and the amplitude on an input side of the differential amplifying unit is set large. Therefore, the problem due to a parasitic capacitance on the horizontal signal lines as bus lines can be solved. This is because power consumption is smaller and a higher-speed transfer operation is possible in transfer of information with the small amplitude than in transfer of information with the large amplitude.

BRIEF DESCRIPTION OF THE DRAWINGS

FIG. 4C is a voltage level chart for explaining a basic operation of the configuration shown in FIG. 4B;

DESCRIPTION OF THE PREFERRED EMBODIMENTS

Embodiments of the present invention will be hereinafter explained with reference to the accompanying drawings. In an example explained below, a CMOS solid-state imaging device, which is an example of a solid-state imaging device of an X-Y address type, is used as a device. It is assumed that all pixels of the CMOS solid-state imaging device are formed by NMOSs.

However, this is only an example. A devise to be used is not limited to a solid-state imaging device of a MOS type. All the embodiments described later can be applied in the same manner to all semiconductor devices for detecting a physical quantity distribution formed by arraying plural unit elements, which have sensitivity to the an electromagnetic wave inputted from the outside such as light or a radiation, in a line shape or a matrix shape <Overview of a Solid-Stage Imaging Device>

Figure 1:
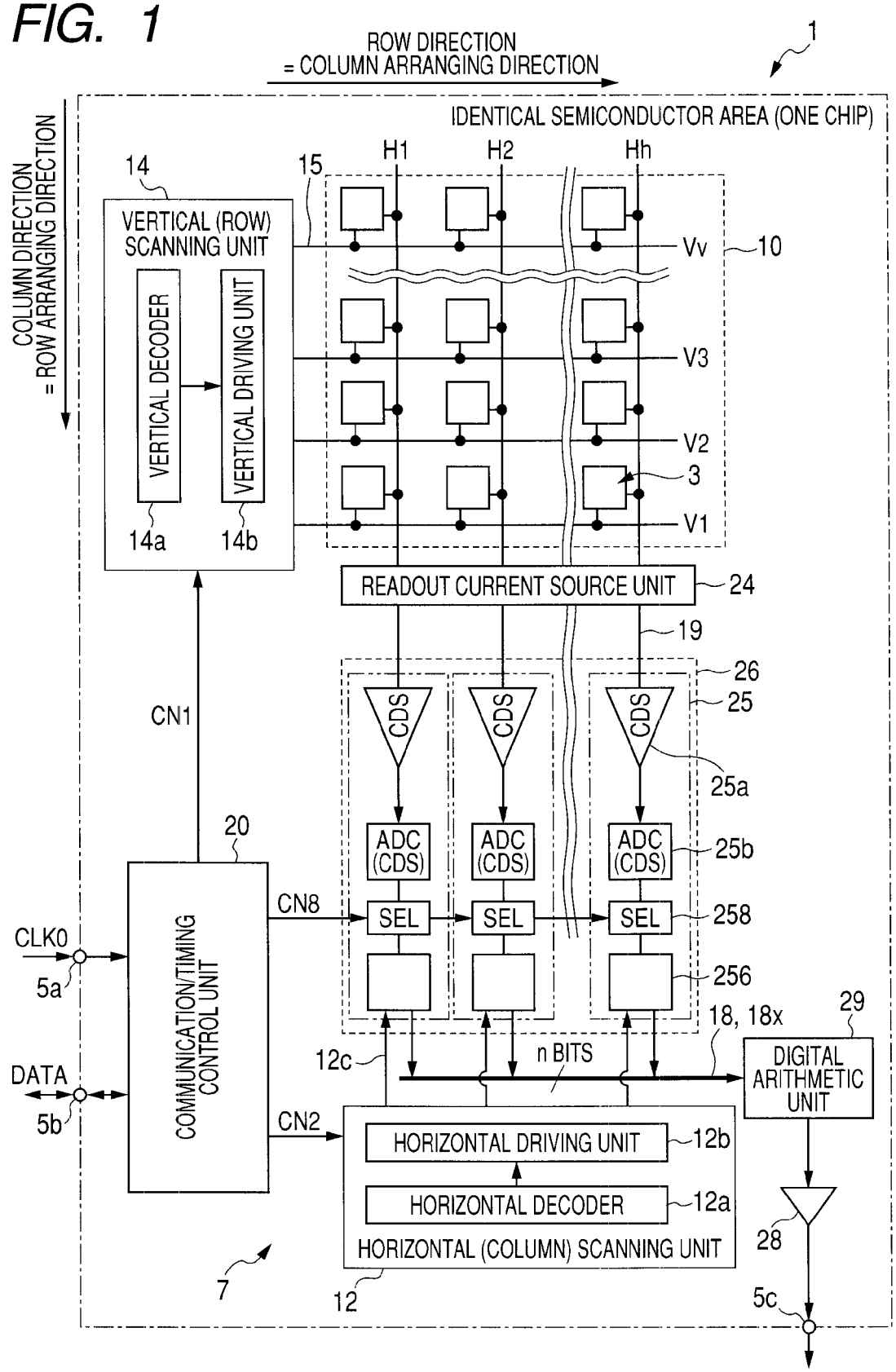
FIG. 1 is a schematic diagram of a CMOS solid-state imaging device as a solid-state imaging device according to an embodiment of the present invention.

FIG. 1 is a schematic diagram of a CMOS solid-state imaging device (a CMOS image sensor) as a solid-state imaging device according to an embodiment of the present invention.

A solid-imaging device 1 has a pixel unit in which plural pixels including light-receiving elements (an example of charge generating units), which output signals corresponding to an incident light amount, are arrayed in rows and columns (i.e., in a two-dimensional matrix shape). Signal outputs from the respective pixels are voltage signals. CDS (Correlated Double Sampling) processing function units, ADCs (Analog Digital Converters), and the like are provided in column parallel in the solid-state imaging device 1.

"CDS processing function units and the digital conversion units are provided in column parallel" means that plural CDS processing function units and plural digital conversion units are provides substantially in parallel to vertical signal lines (an example of column signal lines) 19 in vertical columns.

All the respective plural function units may be arranged on only one edge side (an output side arranged on a lower side in the figure) in a column direction with respect to a pixel array unit 10 when the device is viewed in plane. Alternatively, the respective plural function units may be dividedly arranged on one edge side (the output side arranged on the lower side in the figure) in the column direction with respect to the pixel array unit 10 and the other edge side (an upper side in the figure) on the opposite side of the one edge side. In the latter case, it is advisable that horizontal scanning units that perform readout scanning (horizontal scanning) in a row direction are also dividedly arranged on the respective edge sides and can operate independently from each other.

For example, as a typical example in which the CDS processing function units and the digital conversion units are provided in column parallel, there is a column type in which CDS processing function units and digital conversion units are provided for respective vertical columns in a portion called a column area provided on an output side of an imaging unit and signals are sequentially read out to the output side. The solid-state imaging device 1 is not limited to the column type (the column parallel type). It is also possible to adopt, for example, a form of allocating one CDS processing function unit and one digital conversion unit to adjacent plural (e.g., two) vertical signal lines 19 (vertical columns) or a form of allocating one CDS processing function unit and one digital conversion unit to N vertical signal lines 19 (vertical columns) at an interval of N lines (N is a positive integer; N−1 lines are arranged among N lines).

In all the forms except the column type, the plural vertical signal lines 19 (vertical columns) use one CDS processing function unit and one digital conversion unit in common. Therefore, a switching circuit (a switch) for supplying pixel signals for plural columns, which are supplied from the pixel array unit 10 side, to the one CDS processing function unit and the one digital conversion unit is provided. Depending on processing at a post-stage, measures such as measures for providing a memory that stores an output signal are separately necessary.

In any case, by adopting, for example, the form of allocating one CDS processing function unit and one digital conversion unit to the plural vertical signal lines 19 (vertical columns), it is possible to simplify the structure in the respective unit pixels and cope with an increase in pixels of an image sensor, a reduction in size, a reduction in cost, and the like compared with a form of performing signal processing for respective pixel signals after reading out the pixel signals in pixel column units to perform the same signal processing in the respective unit pixels.

Pixel signals for one row can be simultaneously processed in parallel in plural signal processing units arranged in column parallel. Therefore, the signal processing units can be actuated at low speed compared with the case in which processing is performed in one CDS processing function unit and one digital conversion unit on the output circuit side and on the outside of the device. The form is advantageous in terms of power saving, band performance, noise, and the like. In other words, when power consumption, band performance, and the like are set the same, a high-speed operation of the entire sensor is possible.

In the case of the structure of the column type, there is also an advantage that the signal processing units can be actuated at low speed, the structure is advantageous in terms of power consumption, band performance, noise, and the like and the switching circuit (the switch) is unnecessary. In the embodiment described below, the column type is adopted unless specifically noted otherwise.

As shown in FIG. 1, the solid-state imaging device 1 according to this embodiment includes the pixel array unit 10 also referred to as a pixel unit, an imaging unit, and the like in which plural unit pixels 3 are arrayed in rows and columns, a driving control unit 7 provided on an outer side of the pixel array unit 10, a readout current source unit 24 that supplies an operation current (a readout current) for pixel signal readout to the unit pixels 3 of the pixel array unit 10, a column processing unit 26 having column circuits 25 arranged respective vertical columns, and an output circuit (S/A: sense amplifier) 28. The respective function units are provided on an identical semiconductor substrate.

A digital arithmetic unit 29 may be provided at a pre-stage of the output circuit 28 when necessary. "When necessary" means that, for example, differential processing between a reset level Srst and a signal level Ssig is performed at post-stages of the column circuits 25 rather than in the column circuits 25 or data correction corresponding to complement count processing and other multiply-accumulate processing are performed by the column processing unit 26.

In FIG. 1, for simplification of illustration, a part of rows and columns are now shown. However, actually, several tens to several thousands unit pixels 3 are arranged in the respective rows and columns. The unit pixels 3 typically include photodiodes as light-emitting elements (charge generating units), which are an example of detecting units, and amplifiers within pixel (an example of pixel-signal generating units) having semiconductor elements (e.g., transistors) for amplification.

In the solid-state imaging device 1, the pixel array unit 10 can be adapted to color imaging by using color separation filters. In other words, the pixel array unit 10 is adapted to color image imaged by providing color filters of any one of color separation filters, which are formed by a combination of color filters of plural colors for imaging color images, in, for example, a so-called Bayer array on light-receiving surfaces on which an electromagnetic wave (in this example, light) of the respective charge generating units (photodiodes, etc.) is made incident.

Each of the column circuits 25 has functions of a differential processing unit (CDS) 25a that executes differential processing between a signal level immediately after pixel reset (hereinafter referred to as reset level), which is a reference level of a pixel signal So, and a signal level to acquire a signal component indicated by a difference between the reset level and the signal level and an AD conversion unit (ADC) 25b that converts the signal component as the difference between the reset level, which is the reference level of the pixel signal, and the signal level into N-bit digital data.

The order of arrangement of the differential processing unit 25a and the AD conversion unit 25b is arbitrary. For example, as shown in FIG. 1, the differential processing unit 25a may perform the differential processing between an analog reset level and an analog signal level and the AD conversion unit 25b may convert a result of the differential processing into digital data. Alternatively, although not shown in the figure, the AD conversion unit 25b may convert the reset level and the signal level into digital data, respectively, and the differential processing unit 25a may calculate a difference between the respective digital data. It is not indispensable to convert the pixel signal into the digital data in the AD conversion unit 25b.

The function of the differential processing unit 25a is equivalent to processing for calculating a difference between a reset level Srst and a signal level Ssig including a true signal component Vsig (corresponding to a received light amount) of a pixel signal voltage Vx (equivalent to so-called CDS processing). With the function, it is possible to remove noise signal components called fixed pattern noise (FPN) and reset noise.

In this way, the column circuit 25 according to this embodiment can be configured to function as an AD conversion/noise removal signal processing device having both an AD conversion function for converting analog pixel signal transferred from the pixel array unit 10 into digital data and a function of controlling and removing noise components. The column circuit 25 converts pixel signal voltages Vx outputted from the unit pixels 3 in a row selected by a vertical scanning unit 14, which selects a row address, into n-bit digital data simultaneously for one row and performs noise removal signal processing.

As the AD conversion processing in the column processing unit 26, it is possible to adopt a method of AD-converting analog signals, which are held in parallel in row units, in parallel row by row using the column circuits 25 (more specifically, the AD conversion units 25b) provided in the respective columns. In this case, it is advisable to adopt an AD conversion system of a reference signal comparison type (a single slope integration type, a ramp signal comparison type, etc.). This method has a characteristic that, since an AD converter can be realized by the simple structure, a circuit size is not large even if the circuits are provided in parallel.

In this case, by contriving a circuit configuration and operations of the AD conversion units 25b, it is possible to perform CDS processing for calculating, with respect to pixel signals of a voltage mode inputted through the vertical signal lines 19, a difference between a reset level immediately after pixel reset and a true signal level (corresponding to a received light amount). It is possible to cause the AD conversion units 25b to function as the differential processing units 25a that remove the noise signal components such as the fixed pattern noise.

In the AD conversion of the reference signal comparison type, a count operation effective period (a signal indicating the period is referred to as count enable signal) is determined on the basis of time from the start of the conversion (the start of comparison processing) to the end of the conversion (the end of the comparison processing) and an analog processing object signal is converted into digital data on the basis of the count enable signal.

The adoption of the AD conversion system of the reference signal comparison type for the column circuit 25 is only an example. Other arbitrary circuit configuration can be preferably adopted as long as the AD conversion processing and the noise removal signal processing can be performed.

The pixel signal voltages Vx are AD-converted into digital data and horizontally transferred by the column circuits 25. However, the column circuits 25 are not limited to this. Analog information corresponding to the pixel signal voltages Vx may be horizontally transferred. In this case, it is advisable to perform, for each of pixel columns, the CDS processing for calculating a difference between the reset level Srst and the signal level Ssig of the pixel signal voltages Vx in the differential processing unit 25a.

This embodiment has a characteristic in the mechanism for solving problems due to a load capacitance on horizontal signal lines 18 in horizontal transfer. As a specific mechanism of the AD conversion of the reference signal comparison type, any mechanism such as the mechanism disclosed in Non-Patent Document 1 may be used.

As described in detail later, the horizontal transfer according to this embodiment has a characteristic in that two pieces of information having complementarity representing one piece of information corresponding to the pixel signal voltages Vx are horizontally transferred to restore the original information in a post-stage circuit. In particular, preferably, concerning respective bit data of digital information obtained by AD-converting the pixel signal voltages Vx, two logically-opposite complementary data having complementarity are horizontally transferred to restore the original bit data in the post-stage circuit.

For example, when the analog information is horizontally transferred, differential signals with opposite polarities are transferred to the output circuit 28 through different horizontal signal lines 18 and 18x forming a pair, respectively. When the digital data is horizontally transferred, complementary data (complementary bit data) having a relation of opposite L/H for each of bits are transferred to the output circuit 28 through the horizontal signal lines 18 and 18x (for each of the bits) forming a pair, respectively. It is arbitrary to decide how the differential signals and the complementary data are generated. The differential signals and the complementary data are collectively referred to as complementary information.

The driving control unit 7 has a control circuit function for sequentially reading out signals of the pixel array unit 10. For example, the driving control unit 7 includes a horizontal scanning unit (a column scanning circuit) 12 that controls a column address and column scanning, a vertical scanning unit (a row scanning circuit) 14 that controls a row address and row scanning, and a communication/timing control unit 20 that has a function of, for example, generating an internal clock.

The unit pixels 3 are connected to the vertical scanning unit 14 and the column processing unit 26, in which the column circuits 25 are provided for the respective vertical columns, through row control lines 15 for row selection and the vertical signal lines 19, respectively. The row control lines 15 indicate wiring in general that enters the pixels from the vertical scanning unit 14.

The vertical scanning unit 14 selects a row of the pixel array unit 10 and supplies a necessary pulse to the row. For example, the vertical scanning unit 14 includes a vertical decoder 14a that defines a readout row in the vertical direction (selects a row of the pixel array unit 10) and a vertical driving unit 14b that supplies a pulse to and drives the row control lines 15 for the unit pixels 3 on a readout address (in the row direction) defined by the vertical decoder 14a. The vertical decoder 14a selects, other than a row from which a signal is read out (a readout row: also referred to as selected row or signal output row), for example, a row for an electronic shutter.

The horizontal scanning unit 12 has a function of a readout scanning unit that selects the column circuits 25 of the column processing unit 26 in order in synchronization with a clock and reads out data obtained by digitally converting pixel signals to the horizontal signal lines 18. For example, the horizontal scanning unit 12 includes a horizontal decoder 12a that defines a readout row in the horizontal direction (selects the respective column circuits 25 in the column processing unit 26) and a horizontal driving unit 12b that guides respective signals of the column processing unit 26 to the horizontal signal lines 18 in accordance with a readout address defined by the horizontal decoder 12a. The horizontal signal lines 18 are bus lines for transferring the data generated by the column circuits 25.

Although not shown in the figure, the communication/timing control unit 20 includes a functional block of a timing generator TG (an example of a readout address control device) that supplies clocks necessary for operations of the respective units and a pulse signal of predetermined timing and a functional block of a communication interface that receives a master clock CLK0 supplied from a main control unit on the outside via a terminal 5a, receives data instructing an operation mode or the like supplied from the main control unit on the outside via a terminal 5b, and outputs data including information on the solid-state imaging device 1 to the main control unit on the outside.

For example, the communication/timing control unit 20 outputs a horizontal address signal to the horizontal decoder 12a and outputs a vertical address signal to the vertical decoder 14a. The respective decoders 12a and 14a receive the address signals and select a row and a column corresponding to the address signals, respectively. The horizontal scanning unit 12 and the vertical scanning unit 14 include the decoders 12a and 14a for address setting and switch readout addresses by performing a shift operation (scanning) in response to control signals CN1 and CN2 given from the communication/timing control unit 20.

In this case, since the unit pixels 3 are arranged in a two-dimensional matrix shape, it is advisable to increase speed of reading out pixel signals and pixel data by performing (vertical) scanning for accessing and capturing, in row units (in column parallel), analog pixel signals generated by the pixel-signal generating units, which are provided in the unit pixels 3, and outputted in the column direction through the vertical signal lines 19 and, then, performing (horizontal) scanning for accessing in the row direction, which is an arranging direction of the vertical columns, and reading out pixel signals (in this example, digitized pixel data) to an output side. It goes without saying that not only the scanning but also random access for reading out information of necessary unit pixels 3 by directly designating addresses of unit pixels 3 desired to be read out is possible.

The respective components of the driving control unit 7 such as the horizontal scanning unit 12 and the vertical scanning unit 14 are adapted to form, together with the pixel array unit 10, a part of the solid-state imaging device 1 as a so-called one-chip component integrally formed in a semiconductor area of a monocrystal silicon (provided on an identical semiconductor substrate) and as a CMOS image sensor, which is an example of a semiconductor system.

The solid-state imaging device 1 may be formed as one chip in which the respective units are integrally formed in the semiconductor area in this way. Alternatively, although not shown in the figure, the solid-state imaging device 1 may take a module-like form having an imaging function formed by collectively packaging, besides the various signal processing units such as the pixel array unit 10, the driving control unit 7, and the column processing unit 26, optical systems such as a photographing lens, an optical low-pass filter, and/or an infrared cut filter.

In the solid-state imaging device 1 having such structure, pixel signals outputted from the unit pixels 3 are supplied, for the respective vertical columns, to the column circuits 25 of the column processing unit 26 through the vertical signal lines 19.

In the case of the basic structure in which data storing/transferring and outputting units 256 are not provided, outputs of the AD conversion units 25b or the differential processing units 25a are connected to the horizontal signal lines 18. When a signal is subjected to differential processing in analog by the differential processing units 25a and, then, converted into digital data by the AD conversion units 25b, outputs of the AD conversion units 25b are connected to the horizontal signal lines 18. Conversely, when a signal is converted into digital data by the AD conversion units 25b and, then, subjected to differential processing by the differential processing units 25a, outputs of the differential processing units 25a are connected to the horizontal signal lines 18. The former case is explained below as shown in FIG. 1.

A control pulse (a horizontal data transfer clock φH) is inputted from the horizontal scanning unit 12 to the AD conversion units 25b through control lines 12c. The AD conversion units 25b have a latch function of holding a count result and holds data until an instruction by a control pulse is received through the control lines 12c.

In this embodiment, as shown in the figure, output sides of the respective column circuits 25 include, at post-stages of the AD conversion units 25b, the data storing/transferring and outputting units 256 as N-bit memory devices that store count results held by the AD conversion units 25b and switches (SELs) 258, which are an example of data switching units, arranged between the AD conversion units 25b and the data storing/transferring and outputting units 256.

When the structure including the data storing/transferring and outputting units 256 is adopted, a memory transfer instruction pulse CN8 as a control pulse is supplied to one of the switches 258 from the communication/timing control unit 20 at predetermined timing in common with the other switches 258 in the other vertical columns.

When the memory transfer instruction pulse CN8 is supplied, the switches 258 transfer, on the basis of a load function, data of the AD conversion units 25b in the columns corresponding to the switches 258 to the data storing/transferring and outputting units 256. The data storing/transferring and outputting units 256 hold and store the transferred data.

Since the switches 258 are provided, the horizontal scanning unit 12 according to this embodiment has a function of a readout scanning unit that reads out the data held by the respective data storing/transferring and outputting units 256 in parallel to the processing performed by the respective differential processing units 25a and the respective AD conversion units 25b of the column processing unit 26, respectively.

When the structure including the data storing/transferring and outputting units 256 is adopted, the AD conversion units 25b can transfer the AD conversion data held therein to the data storing/transferring and outputting units 256. Therefore, it is possible to control the AD conversion processing of the AD conversion units 25b and an operation for reading out a result of the AD conversion to the horizontal signal lines 18 independently from each other. A pipeline operation for performing the AD conversion processing and an operation for reading out a signal to the outside in parallel can be realized.

For example, the AD conversion is completed by latching (holding or storing) an AD conversion result of pixel data in the AD conversion units 25b. Thereafter, the pixel data is transferred to the data storing/transferring and outputting units 256 at predetermined timing and storing and holding the pixel data therein. Thereafter, the column circuits 25 sequentially output the pixel data stored and held in the data storing/ transferring and outputting units 256 to the outside of the column processing unit 26 and the outside of the chip having the pixel array unit 10 from an output terminal 5c on the basis of a shift operation synchronizing with a control pulse inputted from the horizontal scanning unit 12 through the control lines 12c at predetermined timing.

<<Mechanism of the AD Conversion of the Reference Signal Comparison Type>>

Figure 2A:
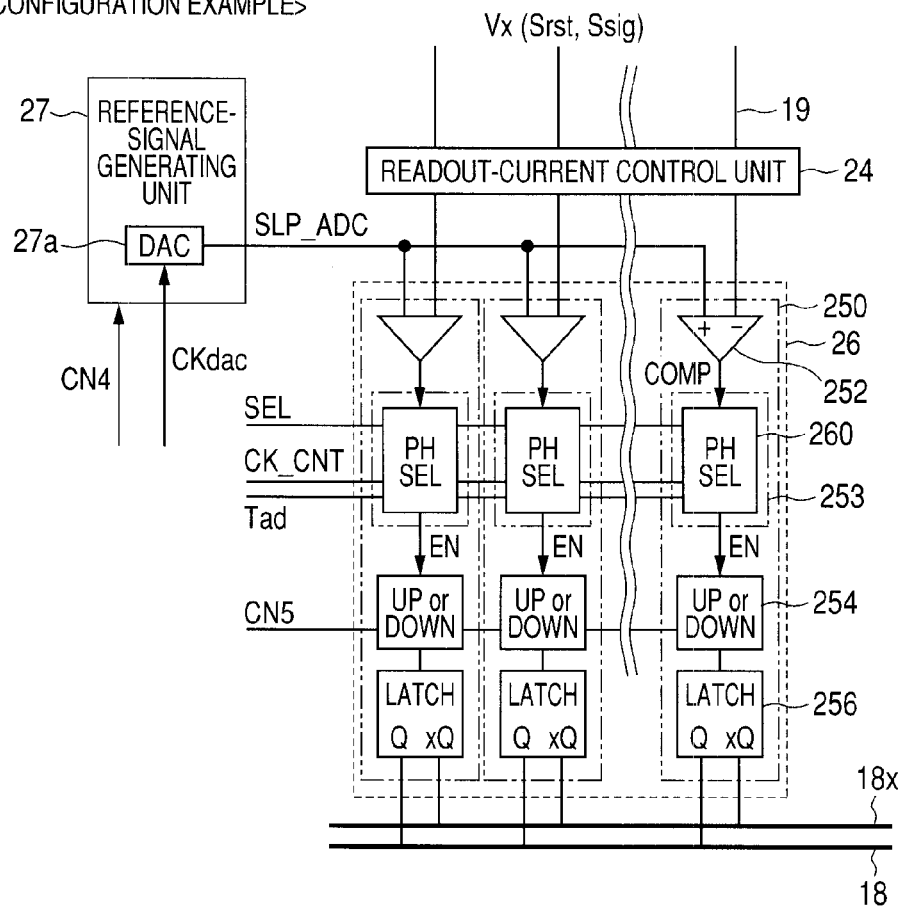
FIG. 2A is a diagram showing an example (a first example) of a configuration of a basic circuit for executing AD conversion of a reference signal comparison type.
Figure 2B:
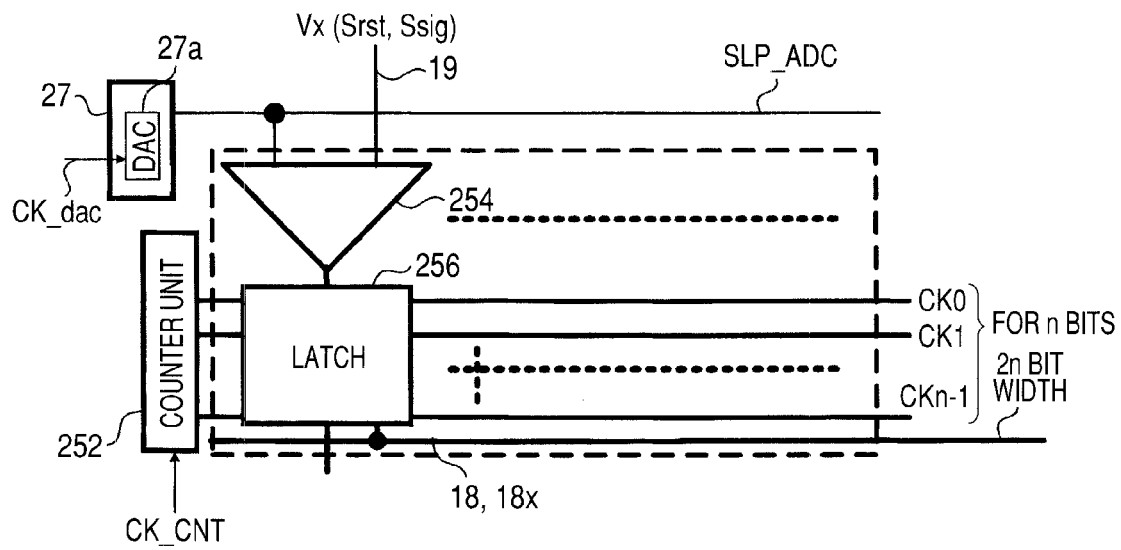
FIG. 2B is a diagram showing an example (a second example) of the configuration of the basic circuit for executing the AD conversion of the reference signal comparison type.

FIGS. 2A and 2B show examples of a basic circuit configuration for executing the AD conversion of the reference signal comparison type.

As shown in FIG. 2A, as a first configuration example for executing the AD conversion of the reference signal comparison type, the circuit includes a reference-signal generating unit 27 that supplies a reference signal SLP_ADC for AD conversion to the column processing unit 26. The reference signal SLP_ADC only has to have a waveform that linearly changes with a certain tilt generally. The change may be a smooth slope-like change or may be a sequential step-wise change.

The reference-signal generating unit 27 includes a digital analog converter (DAC) 27a. The reference-signal generating unit 27 generates a reference signal SLP_ADC from an initial value indicated by control data CN4 from the communication/timing control unit 20 in synchronization with a count clock CKdac and supplies the generated reference signal SLP_ADC to the respective AD conversion units 25b of the column processing unit 26 as a reference voltage (an ADC reference signal) for AD conversion. Although not shown in the figure, it is advisable to provide a filter for noise prevention.

The control data CN4 supplied from the communication/timing control unit 20 to the DA converter 27a of the reference-signal generating unit 27 includes information for equalizing a rate of change of digital data with respect to time such that the reference signal SLP_ADC in each comparison processing has basically the same tilt (a rate of change). Specifically, a count value is changed by 1 at each unit time in synchronization with the count clock CKdac and the count value is converted into a voltage signal by the DA converter of a current addition type. The count clock CKdac may be identical with a count clock CK_CNT.

The AD conversion units 25b include voltage comparing units (comparators) 252 that compare the reference signal SLP_ADC generated by the DA converter 27a of the reference-signal generating unit 27 and analog pixel signals obtained from the unit pixels 3 through the vertical signal lines 19 (H1, H2, ..., and Hh) for the respective row control lines 15 (V1, V2, V3, ..., and Vv) and counter units 254 that count time until the voltage comparing units 252 complete comparison processing or until predetermined time after the completion and hold a result of the count. The AD conversion units 25b have an n-bit AD conversion function.

The counter units 254 in this configuration example have both functions of a counting unit that counts the count clock CK_CNT according to a change with time of the reference signal SLP_ADC and generates count data (a count value) and a data holding unit (a count-value holding unit) that holds count data corresponding to the pixel signal voltages Vx in the count data generated by the counting unit.

The AD conversion units 25b have, between the voltage comparing units 252 and the counter units 254, count-operation control units 253 that control a period of count processing and an operation for holding the count data in the counter units 254. The count-operation control units 253 have count-phase adjusting units (PH SEL) 260 that control a period of count processing (a count operation effective period TEN) in the counter units 254. A count period control signal SEL for controlling a count period is supplied to the count-phase adjusting units 260 from the communication/timing control unit 20. A comparison pulse COMP is supplied to the count-phase adjusting units 260 from the voltage comparing units 252.

Various ways of using the count period control signal SEL are conceivable. For example, the count period control signal SEL is used to uniformly control count operation effective periods of the counter units 254 in all the columns, control count operation effective periods for respective groups formed by dividing the vertical columns into several (typically, two) groups, and control the count operation effective periods according to levels of the pixel signal voltages Vx.

The count-phase adjusting units 260 logically invert, on the basis of the count period control signal SEL from the communication/timing control unit 20 or comparison results of the pixel signal voltages Vx and the reference signal SLP_ADC (collectively referred to as phase adjustment control signals) of the voltage comparing units 252 in the preceding rows or the own rows (comparators different from the voltage comparing units 252 may be used), the comparison pulses COMP from the voltage comparing units 252 and pass the comparison pulses COMP to the counter units 254 as count enable signals EN (in opposite phases). Alternatively, the count-phase adjusting units 260 directly pass the comparison pulses COMP to the counter units 254 as count enable signals EN (in the same phase). The count-phase adjusting units 260 are an example of count-period control units that determine count periods.

For example, EX-OR (exclusive OR) gates are used as the count-phase adjusting units 260. The comparison pulses COMP are inputted to one input terminals and the phase adjustment control signal is inputted to the other input terminals. In this case, the EX-OR gates logically invert the comparison pulses COMP into the count enable signals EN when the phase adjustment control signal is at an H level and directly use the comparison pulses COMP as the count enable signals EN when the phase adjustment control signal is at an L level.

In column AD conversion processing in this configuration example, the reference signal SLP_ADC is supplied from the DA converter 27a in common to the voltage comparing units 252 arranged in the respective columns and, for the pixel signal voltages Vx processed by the respective voltage comparing units 252, the voltage comparing units 252 perform the comparison processing using the common reference signal SLP_ADC. The counter units 254 perform, using outputs of the count-phase adjusting units 260 as the count enable signals EN, the count processing on the basis of the count clock CK_CNT when the count enable signals EN are at the H level and hold count results when the count processing is finished.

Besides the count period control signal SEL, a control signal CN5 for instructing other control information such as information on whether the counter units 254 perform two times of count processing in a down-count mode or an up-count mode and setting and reset processing for an initial value Dini in the count processing in the first time is inputted to the count-phase adjusting units 260 and the counter units 254 of the respective AD conversion units 25b from the communication/timing control unit 20.

A step-like reference signal SLP_ADC generated by the reference-signal generating unit 27 is inputted to one input terminals RAMP of the voltage comparing units 252 in common with the other input terminals RAMP of the voltage comparing units 252. The vertical signal lines 19 in the vertical columns corresponding to the other input terminals are connected to the other input terminals. Pixel signal voltages from the pixel array unit 10 are inputted to the other input terminals, respectively. Output signals (comparison pulses COMP) of the voltage comparing units 252 are supplied to the count-phase adjusting units 260.

The count clock CK_CNT is inputted to clock terminals CK of the counter units 254 from the communication/timing control unit 20 in common. Although the structure of the counter units 254 is not shown in the figure, the counter unit 254 can be realized by changing a wiring form of data storing units including latches to a synchronous counter format. The counter units 254 perform internal count with the input of one count clock CK_CNT.

When the counter units 254 switch a down-count operation and an up-count operation in the two times of count processing for acquiring digital data Dsig of the signal component Vsig of one pixel, preferably, an up-down counter that can switch the down-count operation and the up-count operation is used.

On the other hand, when the counter units 254 only have to perform one of the down-count operation and the up-count operation in the two times of count processing, an up-count or a down-counter corresponding to the operation only has to be used. However, in principle, it is also possible that, as a form of use, the up-down counter that can switch the down-count operation and the up-count operation is used to perform one of the down-count operation and the up-count operation. However, usually, the up-down counter needs a circuit configuration for the mode switching. Compared with a configuration corresponding to only a single count mode of the up-counter and the down-counter, a circuit size is large. Therefore, when the counter units 254 only have to perform any one of the down-count operation and the up-count operation, it is advisable not to adopt the up-down counter.

As the counter units 254, it is preferable to use asynchronous counters from which count output values are outputted without synchronizing with the count clock CK_CNT. Basically, it is also possible to use synchronous counters. However, in the case of the synchronous counters, operations of all flip-flops (counter basic elements) are limited by the count clock CK_CNT. Therefore, when a higher-frequency operation is requested, as the counter units 254, it is preferable to use asynchronous counters suitable for a high-speed operation because an operation limiting frequency thereof is determined only by a limiting frequency of a first flip-flop (counter basic element).

Control pulses are inputted to the counter units 254 from the horizontal scanning unit 12 through the control lines 12c. The counter units 254 have a latch function of holding a count result. The counter units 254 hold counter output values until instructions by the control pulses are received through the control lines 12c.

On output sides of the respective AD conversion units 25b, for example, outputs of the counter units 254 can be connected to the horizontal signal lines 18. Alternatively, as shown in FIG. 1, it is also possible to adopt a configuration in which the data storing/transferring and outputting units 256 as memory devices for storing count results held by the counter units 254 are provided at post-stages of the counter units 254.

Outputs of the data storing/transferring and outputting unit 256 are connected to horizontal signal lines. As described above, in this embodiment, complementary data having a relation of opposite L/H for each of bits are transferred to the output circuit 28. Therefore, the horizontal signal lines are, for example, 2*n bus lines corresponding to the number of bits "n" (n is a positive integer) treated by the column circuits 25 and a set (the horizontal signal lines 18 and 18x) for transferring complementary data. For example, in the case of 10 (=n) bits, 2*10=20 bus lines are arranged.

In terms of a count operation effective period, the AD conversion of the reference signal comparison type can be roughly divided into a former half count operation and a latter half count operation. In the former half count operation, counting is started at a point when a change in the reference signal SLP_ADC is started and the counting is finished at a point when the reference signal SLP_ADC and a processing object signal voltage coincide with each other. In the latter half count operation, counting is started at a point when the reference signal SLP_ADC and the processing object signal voltage coincide with each other and the counting is finished at a point when the counting reaches a desired count number in that counting (typically, the processing reaches a point when a maximum AD conversion period).

In this specification, count processing performed in a former half period from the point when the change in the reference signal SLP_ADC is started to a point when the reference signal SLP_ADC and the pixel signal voltages Vx become identical is also referred to as count processing for real numbers. On the other hand, count processing performed in a latter half period from the point when the reference signal SLP_ADC and the pixel signal voltages Vx become identical to a point when the processing reaches the maximum AD conversion period in that processing is also referred to count processing for complements.

In terms of a count mode, the AD conversion can be roughly divided in to processing in the up-count mode and processing in the down-count mode.

In pixel signals So (the pixel signal voltages Vx) outputted from the vertical signal lines 19, in time series, in general, the signal level Ssig appears after the reset level Srst including noise of pixel signals as the reference level. Processing for the reference level (the reset level Srst; practically, equivalent to the reset level Srst) is referred to as processing in a pre-charge phase (which may be abbreviated as P phase) (or processing in a reset counter period). Processing for the signal level Ssig is referred to as processing in a data phase (which may be abbreviated as D phase) (or processing in a data counter period). When the D phase processing is performed after the P phase processing, the D phase processing is processing for the signal level Ssig obtained by adding the signal component Vsig to the reset level Srst.

When the first configuration example is adopted, the counter units 254 are provided in the respective vertical columns. Therefore, when the CDS function is executed together with the AD conversion for each of the columns in the AD conversion of the reference signal comparison type, various processing methods can be adopted according to a combination of the former half count operation and the latter half count operation, count modes (up-count and down-count), and according to which of the former half count operation and the latter half count operation and the count modes are adopted in the P phase processing and the D phase processing.

On the other hand, as shown in FIG. 2B, as a second configuration example for executing the AD conversion of the reference signal comparison type, like the reference-signal generating unit 27, the counter units 254 are commonly used for the respective vertical columns. The column circuits 25 have the voltage comparing units 252 and the data storing/transferring and outputting units 256. The counter units 254 perform, in the respective kinds of P phase processing and the D phase, the up-count operation (or the down-count operation) during the maximum AD conversion period corresponding to a slope period of the reference signal SLP_ADC. Count data (also referred to as count clocks) CK0, . . . , and CKn−1 of respective bits of the counter units 254 are notified to the data storing/transferring and outputting units 256 in the respective vertical columns. The data storing/transferring and outputting units 256 in the respective vertical columns capture and hold count data of the counter units 254 when the comparison outputs COMP of the voltage comparing units 252 in the columns are inverted.

The counter units 254 in this configuration example have a function of a counting unit that counts the count clock CK_CNT according to a change with time of the reference signal SLP_ADC and generates count data (a counted value). The data storing/transferring and outputting units 256 have a function of a data holding unit (a counted value holding unit) that holds count data corresponding to the pixel signal voltage Vx in the count data generated by the counting unit.

The data storing/transferring and outputting units 256 hold respective data Dp and Dd acquired in the respective kinds of P phase processing and the D phase processing in different storing units in the inside thereof. The data storing/transferring and outputting units 256 transfer, under the control by the horizontal scanning unit 12, the respective data Dp and Dd acquired in the respective kinds of P phase processing and the D phase processing to the digital arithmetic unit 29 through the respective horizontal signal lines 18. The digital arithmetic unit 29 calculates a difference between the respective data Dp and Dd to calculate the digital data Dsig of the signal component Vsig.

Outputs of the data storing/transferring and outputting units 256 are connected to the horizontal signal lines. In this embodiment, the complementary data having a relation of opposite L/H for each of bits are transferred to the digital arithmetic unit 29. Therefore, the horizontal signal lines are, for example, 2*2*n bus lines corresponding to the number of bits "n" (n is a positive integer) treated by the column circuits 25 and a set (the horizontal signal lines 18 and 18x) for transferring complementary data for each of the data Dp and Dd in the P phase and the D phase. For example, in the case of 10 (=n) bits, 2*2*10=40 bus lines are arranged.

In all the examples of the configuration and the processing methods, in principle, the ramp-like reference signal SLP_ADC is supplied to the comparators (the voltage comparators), the analog pixel signal voltages Vx inputted through the vertical signal lines 19 are compared with the reference signal SLP_ADC, and, when the count operation effective period comes, counting in clock signals it started, whereby the number of clocks in the designated count operation effective period is counted to perform the AD conversion.

In all the configuration examples and the processing methods, during the P phase processing, the reset components Vrst of the unit pixels 3 are read out and the reset level Srst in the pixel signal voltages Vx is processed. Noise that fluctuates for each of the unit pixels 3 is included in the reset components Vrst as an offset. However, fluctuation in the reset components Vrst is generally small and the reset level Srst is generally common to all the pixels. Therefore, an output value (=the reset level Srst) of the reset component Vrst in the pixel signal voltage Vx of the arbitrary vertical signal line 19 is generally known. Therefore, during the P phase processing, it is possible to reduce a comparison period by adjusting the reference signal SLP_ADC. For example, a maximum count number Drm during the P phase processing is set to the count number (128 clocks) for 7 bits.

On the other hand, during the D phase processing, the signal component Vsig corresponding to an amount of incident light for each of the pixel units 3 is read out in addition to the reset level Srst and the signal level Ssig including the signal component Vsig is processed. Therefore, during the D phase processing, since the signal component Vsig corresponding to the amount of incident light is read out, in order to judge magnitude of a light amount in a wide area, it is necessary to set a comparison period wide and substantially change the reference signal SLP_ADC supplied to the voltage comparing units 252. For example, the maximum count number Dsm of the comparison processing during the D phase processing is set to the count number (1024 clocks) for 10 bits to the count number (4096 clocks) for 12 bits. A longest period of the comparison processing for the reset level Srst is reduced to be shorter than a longest period of the comparison processing for signal level Ssig. Instead of setting both the longest periods the same, by setting the former longest period shorter than the latter longest period in this way, a total AD conversion period for two times of AD conversion is reduced.

<Operations of the Solid-State Imaging Device; Operations in a First Processing Example>

Figure 3A:
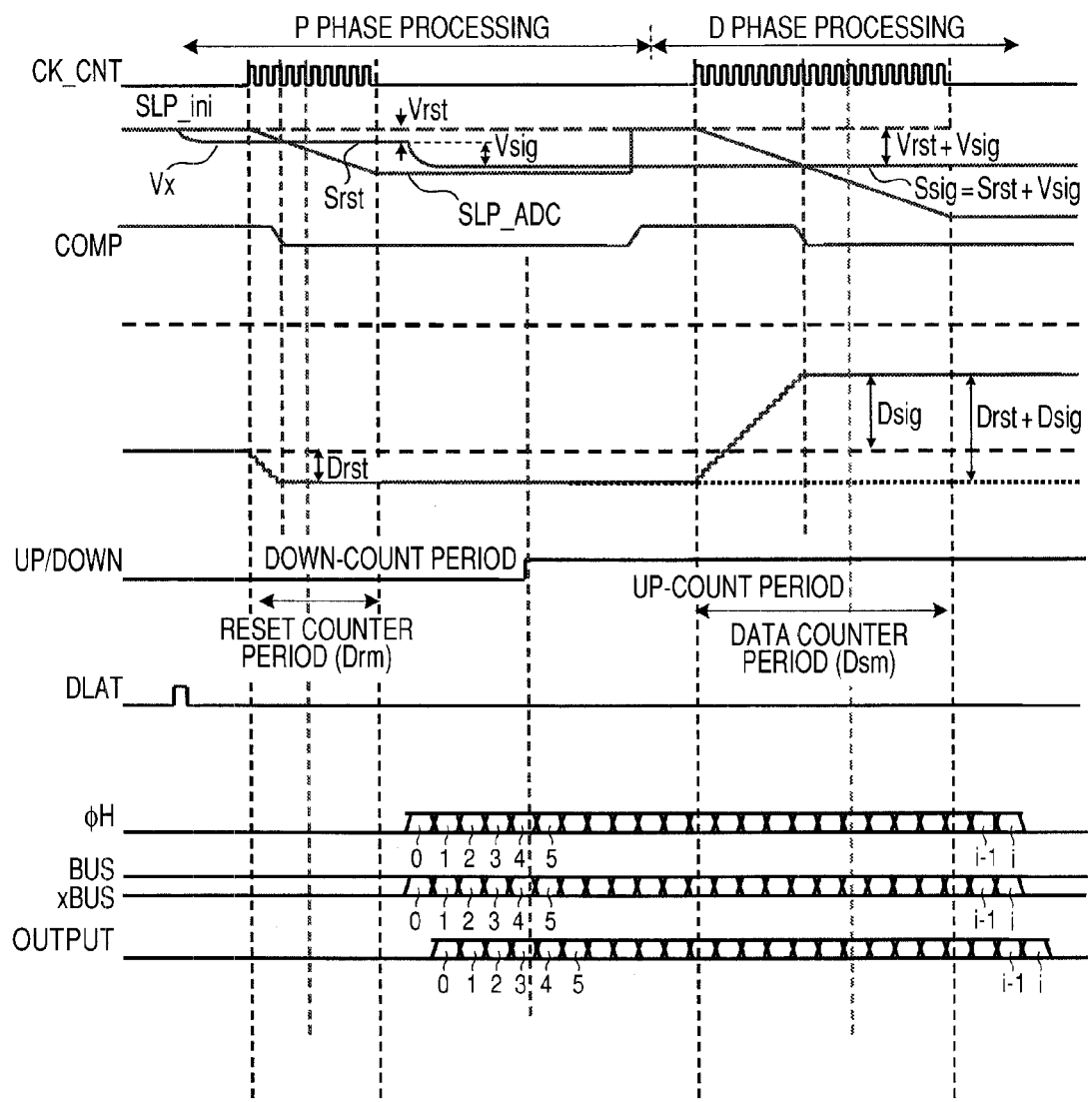
FIG. 3A is a timing chart for explaining operations in a first processing example of the AD conversion of the reference signal comparison type.

FIG. 3A is a timing chart for explaining operations in a first processing example of the AD conversion of the reference signal comparison type. When the first processing example is applied, the first configuration example shown in FIG. 2A is adopted as a circuit configuration.

As a count operation effective period in the AD conversion of the reference signal comparison type, when differential processing between a reset level and a signal level is performed in the column circuits 25, for example, in general, at both the two times of processing, it is possible to apply the first processing example in which the start of counting is set at a point when a change in the reference signal SLP_ADC is started and the end of the counting is set at a point when the reference signal SLP_ADC and the processing object signal voltage become coincide with each other. In other words, in the first processing example, the former half count operation is applied to both the two times of processing.

In this case, in the two times of count processing for acquiring the digital data Dsig of the signal component Vsig of one pixel, the counter units 254 switch and perform the down-count operation and the up-count operation. As an overall operation, when the D phase processing is up-count, the operation may be considered an operation for counting real numbers for the signal level Ssig. When the D phase processing is down-count, the operation may be considered an operation for counting complements (negative numbers) for the signal level Ssig.

Although not explained in detail, basically, for example, a method same as the method disclosed in JP-A-2005-311933 and JP-A-2006-33452 is adopted. In the general AD conversion processing referred to as the reference signal comparison type, first, concerning a certain processing object row Vx, for the vertical columns H1 to Hh, count values of the respective flip-flops of the counter units 254 are reset to a minimum value min of a maximum AD conversion gradation in the P phase, for example, "0" during the processing in the first time, i.e., in a processing period in the P phase, which is an AD conversion period for the reset level Srst. The counter units 254 are set in the down-count mode. The comparison processing for the reference signal SLP_ADC and P phase levels of the pixel signal voltages Vx by the voltage comparing units 252 and the count processing by the counter units 254 are performed in parallel to perform the AD conversion for the P phase levels. It is assumed that, in the beginning, the reference signal SLP_ADC is higher than the P phase levels of the pixel signal voltages Vx and the comparison outputs COMP of the voltage comparing units 252 are at the H level. After the comparison processing is started, the comparison outputs COMP of the voltage comparing units 252 change from the H level to the L level at a point when the reset level Srst as the P phase level and the reference signal SLP_ADC coincide with each other. At this point, the counter units 254 hold a count value indicating a digital value Drst corresponding to a magnitude of the reset level Srst (when a sign is taken into account, indicating −Drst).

During the subsequent processing in the second time, i.e., in a processing period in the D phase, which is an AD conversion period for the signal level Ssig, the signal component Vsig corresponding to an incident light amount for each of the unit pixels 3 is read out in addition to the reset level Srst and an operation same as the readout in the P phase is performed. First, the counter units 254 are set in the up-count mode opposite to the down-count mode during the P phase processing. The comparison processing between the reference signal SLP_ADC and D phase levels of the pixel signal voltages Vx by the voltage comparing units 252 and the count processing by the counter units 252 are performed in parallel to perform the AD conversion of the D phase levels. It is assumed that, in the beginning, the reference signal SLP_ADC is higher than the D phase levels of the pixel signal voltages Vx and the comparison outputs COMP of the voltage comparing units 252 are at the H level. After the comparison processing is started, the comparison outputs COMP of the voltage comparing units 252 change from the H level to the L level at a point when the signal levels Ssig as the D phase levels and the reference signal SLP_ADC coincide with each other. At this point, the counter units 254 hold a count value corresponding to a magnitude of the signal levels Ssig.

In this case, the count values are up-counted, opposite to those in the P phase, from the digital value Drst (a negative value) of the reset levels Srst of the pixel signal voltages Vx acquiring during the read out and the AD conversion in the P phase. The signal levels Ssig are levels obtained by adding the signal components Vsig to the reset level Srst. Therefore, a count value of an AD conversion result of the signal levels Ssig is basically "Drst+Dsig". However, since a start point of the up-count is "−Drst", which is an AD conversion result of the reset level Srst, a count value actually held in the counter units 254 is "−Drst+(Dsig+Drst))=Dsig".

In other words, the count operation in the counter units 254 are count operations in the different count modes; the down-count during the P phase processing and the up-count during the D phase processing. Therefore, in the counter units 254, differential processing (subtraction processing) between the count number "−Drst", which is the AD conversion result of the reset level Srst, and the count number "Drst+Dsig", which is the AD conversion result of the signal levels Ssig, is automatically performed. The count number Dsig corresponding to a result of the differential processing is held in the counters 254. The count number Dsig held in the counter units 254 corresponding to the result of the differential processing represents digital data corresponding to the signal components Vsig.

As described above, the reset level Srst including fluctuation in each of the unit pixels 3 can be removed by the differential processing in the counter units 254 by the two times of readout and count processing, i.e., the down-count during the P phase processing and the up-count during the D phase processing. The AD conversion result of only the signal components Vsig corresponding to the incident light amount for each of the unit pixels 3 can be acquired by a simple configuration. Therefore, the column circuits 25 operate not only as digital conversion units that convert analog pixel signals into digital pixel data but also as CDS processing function units.

The AD conversion processing in the first processing example has a characteristic that, in the count processing in the first time and the count processing in the second time for one pixel, the respective count operations are performed in the down-count P phase processing and in the up-count D phase processing to perform, in practice, the count processing of complements in the P phase and the count processing of real numbers in the D phase. In practice, the count processing for complements is count processing on a negative side and can be regarded as a subtraction element. The count processing for real numbers is count processing on a positive side and can be regarded as an addition element.

In applying the first processing example, the down-count operation and the up-count operation are switched and performed in the two times of count processing for acquiring the digital data Dsig of the signal component Vsig of one pixel. Therefore, it is advisable to use, in the counter units 254, the up-down counter that can switch the down-count operation and the up-count operation.

When the data storing/transferring and outputting units 256 are provided at the post-stages of the counter units 254, a sub-clock DLAT is supplied to the data storing/transferring and outputting units 256 as a memory transfer instruction pulse CN8 from the communication/timing control unit 20 before the operations of the counter units 254 and the horizontal transfer are started. The data storing/transferring and outputting units 256 captures, with the sub-clock DLAT as a trigger, the digital data Dsig in the immediately preceding row Vx−1 held in the counter units 254 into latch circuits in the counter units 254 and hold the digital data Dsig.

After the AD conversion period ends, the column circuits 25 save the digital data Dsig in the counter units 254 in the data storing/transferring and outputting units 256 and start AD conversion for the next row Vx. The digital data Dsig in the preceding row in the data storing/transferring and outputting units 256 are selected in order by the horizontal scanning unit 12 on the background of the AD conversion processing in the column circuits 25 in the respective vertical columns of the column processing unit 26 and transferred to the output circuit 28 as complementary data Qsig and xQsig through the respective horizontal signal lines 18 and 18x for complementary information transfer. The output circuit 28 reproduces the original digital data Dsig on the basis of the complementary data Qsig and xQsig. In parallel to the AD conversion processing, a horizontal transfer operation for the complementary data Qsig and xQsig is performed in parallel to the AD conversion processing. When the horizontal scanning unit 12 sequentially selects the respective vertical columns at high speed, the complementary data Qsig and xQsig in the respective columns are transferred to the output circuit 28 at high speed through drive transistors at the output stages of the data storing/transferring and outputting units 256. Thereafter, the same operation is repeated for the respective rows in order, whereby a two-dimensional image is created.

<Operations of the Solid-State Imaging Device; Operations in a Second Processing Example>

When the differential processing between a reset level and a signal level is performed by the column circuits 25, in both the two times of processing, it is also possible to adopt a second processing example in which counting is started at a point when the reference signal SLP_ADC and processing object signal voltages coincide with each other and the counting is finished at a point when the counting reaches a desired count number in that counting (typically, the processing reaches a point when a maximum AD conversion period). In other words, in the second processing example, the latter half count operation is applied to both the two times of processing.

In this case, as in the above case, in the two times of count processing for acquiring the digital data Dsig of the signal component Vsig of one pixel, the counter units 254 switch and perform the down-count operation and the up-count operation for each of the vertical columns. Therefore, when the second processing example is applied, the first configuration example shown in FIG. 2A is adopted as a circuit configuration.

Basic operations in the second processing example are not so different from those in the first processing example. However, the operations in the second processing example are different from those in the first processing example in that correction of data corresponding to count processing performed in a latter half of the maximum AD conversion period is taken into account. An overall operation in the second processing example may be considered an operation for counting complements. In this case, since complements are counted, a mechanism for data correction for obtaining final data as a real number is necessary. The mechanism for data correction can be realized by an initial value in the count processing in the first time or can be realized by a digital arithmetic operation in the digital arithmetic unit 29 at the post-stage.

A reason why the data correction needs to be taken into account is as described below. A maximum count number during the P phase processing is represented as Drm and a maximum count number corresponding to a maximum signal component Vsig during the D phase processing is represented as Dsm. In this case, a maximum count number during the D phase processing is represented as "Drm+Dsm". In the maximum AD conversion periods in the respective phases, when count processing is performed in a latter half section after the pixel signal voltages Vx and the reference signal SLP_ADC coincide with each other and the comparison outputs COMP are inverted, the count value Dp in the P phase is represented as "Drm−Drst" when a count value of the reset level Srst is represented as Drst. The count value Dd in the D phase is represented as "(Drm+Dsm)−(Drst+Dsig)" when a count value of the signal level Ssig is represented as Dsig.

When counting is performed in the up-count mode during the P phase processing and performed in the down-count mode during the D phase processing and the D phase processing is started from a count value obtained in the P phase processing, data after the D phase processing is represented as (Drm−Drst)−{(Drm+Dsm)−(Drst+Dsig)}=Dsig−Dsm. To offset "−Dsm" and obtain the digital data Dsig of the signal component Vsig, for example, the initial value Dini during the P phase processing in the first time only has to be set to Dsm or Dsm only has to be added to "Dsig−Dsm" by the digital arithmetic unit 29.

In such a combination of the count modes, concerning the signal level Ssig, the complement counting in the latter half of the AD conversion period is performed in down-counts. Therefore, it is possible to obtain Dsig as a value to the positive side by combining a characteristic of count processing to the negative side by the complement counting and a characteristic of count processing to the negative side by the down-count processing. "Dsig−Dsm" described above represents the value. In this case, there is an advantage that the digital data Dsig can be immediately acquired after the processing in the second time depending on setting of an initial value in the first time.

On the other hand, when counting is performed in the down-count mode during the P phase processing and performed in the up-count mode during the D phase processing and the D phase processing is started from a count value obtained in the P phase processing, data after the D phase processing is represented as {(Drm+Dsm)−(Drst+Dsig)}−(Drm−Drst)=Dsm−Dsig. To offset Dsm and obtain a negative number of the digital data Dsig of the signal component Vsig, for example, the initial value Dini during the P phase processing in the first time only has to be set to "−Dsm" or Dsm only has to be subtracted from "Dsm−Dsig" by the digital arithmetic unit 29. To reset the negative number "−Dsig" of the digital data Dsig to a positive number, for example, inverted bit data only has to be outputted from the data storing/transferring and outputting units 256 or bit data only has to be inverted by the digital arithmetic unit 29. However, accurately, there is a difference of "1" when only inversion of the bit data is performed. Therefore, to obtain more accurate data, it is advisable to add "1" in the digital arithmetic unit 29. Alternatively, it is also possible to acquire the digital data Dsig by performing an arithmetic operation {Dsm−(Dsm−Dsig)} in the digital arithmetic unit 29.

In such a combination of the count modes, concerning the signal level Ssig, the complement counting in the latter half of the AD conversion period is performed in up-counts. Therefore, it is possible to obtain Dsig as a value to the negative side by combining a characteristic of count processing to the negative side by the complement counting and a characteristic of count processing to the positive side by the up-count processing. "Dsm−Dsig" described above represents the value.

Figure 3B:
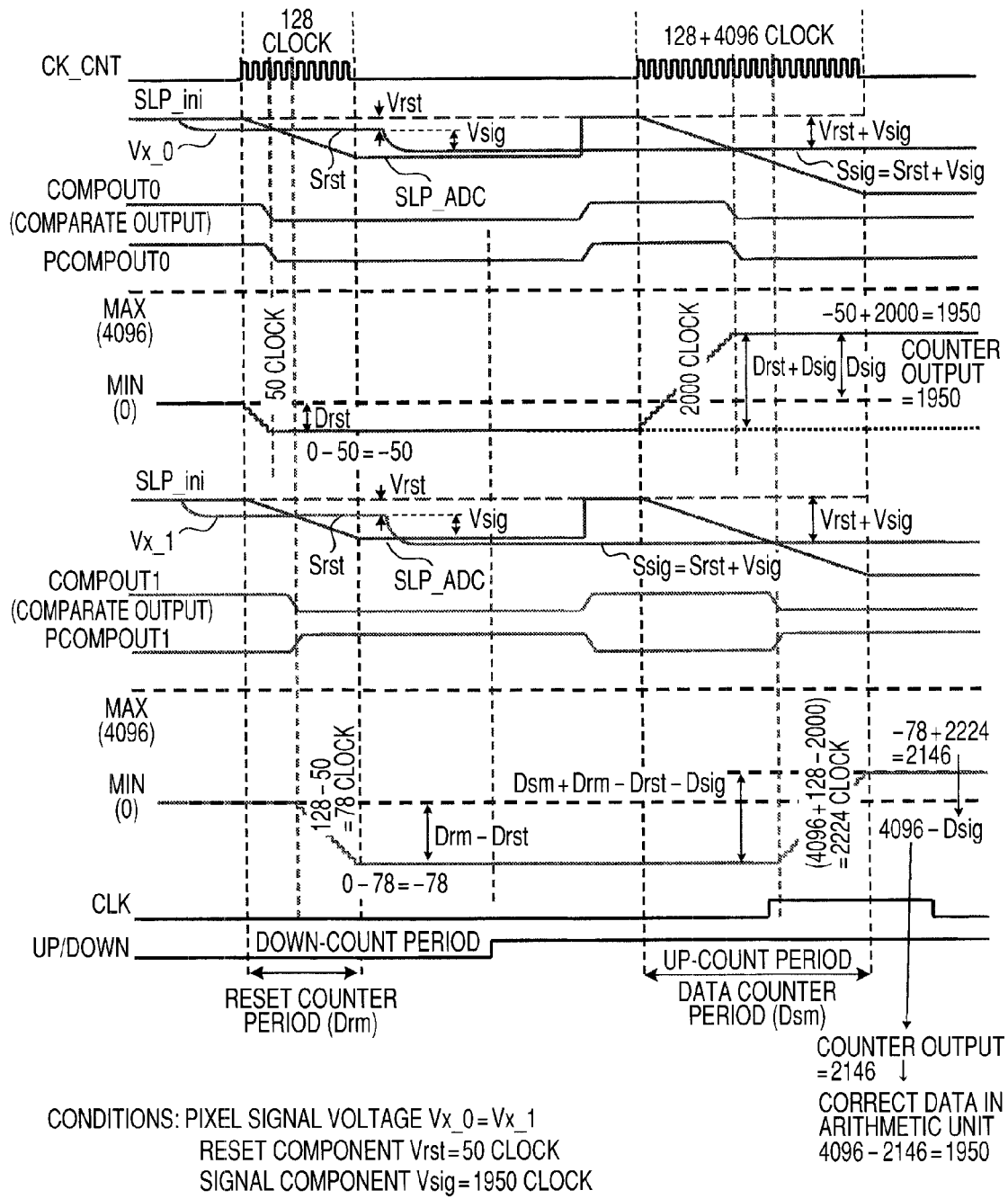
FIG. 3B is a timing chart for explaining operations in a second processing example of the AD conversion of the reference signal comparison type.

FIG. 3B is a timing chart for explaining the operations in the second processing example of the AD conversion of the reference signal comparison type. A combination with the first processing example is shown in FIG. 3B. Specifically, the first processing example is applied when the signal level Ssig in the pixel signal voltage Vx in the preceding row is in a low luminance range with respect to a predetermined threshold. The second processing example is applied when the signal level Ssig is in a high luminance range with respect to the predetermined threshold.

In the example shown in the figure, in both a pixel signal voltage Vx_0, the signal level Ssig in the preceding row of which is in the low luminance range, (the row is not always in the low luminance range) and a pixel signal voltage Vx_1, the signal level Ssig in the preceding row of which is in the high luminance range (the row is not always in the high luminance range), the reset data Drst is 50, the signal data Dsig is 1950, the maximum count number Drm in the P phase processing period is 128, and the maximum count number Dsm in the D phase processing period is 4096. In both the first processing example and the second processing example, counting is performed in the down-count mode during the P phase processing and performed in the up-count mode during the D phase processing. During the P phase processing, count processing is started from an initial value=0. In the figure, the pixel signal voltage Vx_0 and the pixel signal voltage Vx_1 are different and inversion timings of the comparators shift. However, actually, since the pixel signal voltage Vx_0 and the pixel signal voltage Vx_1 are identical as described above, the inversion timings of the comparators are identical.

The first processing example is applied to the pixel signal voltage Vx_0 in both the P phase processing and the D phase processing. Therefore, first, in a Drm=128 count period prepared as a P phase processing period, comparison of the reference signal SLP_ADC and the pixel signal voltage Vx_0 is performed by the voltage comparing units 252. At a fiftieth count when a reset level Srst_0 of the pixel signal voltage Vx_0 and the reference signal SLP_ADC coincide with each other, the comparison output COMP (=COMPOUT0) of the voltage comparing units 252 is inverted. Moreover, the count enable signal EN (=PCOMPOUT0) is also inverted (COMPOUT0 and PCOMPOUT0 are in-phase). The down-count operation is stopped and a count value "−50" is held in the counter units 254.

In a Drm+Dsm=128+4096 count period prepared as a D phase processing period, comparison of the reference signal SLP_ADC and the pixel signal voltage Vx_0 is performed by the voltage comparing units 252. At a "50+1950"=2000th count when a signal level Ssig_0 of the pixel signal voltage Vx_0 and the reference signal SLP_ADC coincide with each other, the comparison output COMP (=COMPOUT0) of the voltage comparing units 252 is inverted. Moreover, the count enable signal EN (=PCOMPOUT0) is also inverted and the count-up operation is stopped. At this point, since the up-count is performed from a count value "−50" obtained in the P phase processing, "−50+2000"=1950 is held in the counter units 254. 1950 coincide with the signal data Dsig.

On the other hand, the second processing example is applied to the pixel signal voltage Vx_1 in both the P phase processing and the D phase processing. Therefore, first, in the Drm=128 count period prepared as the P phase processing period, comparison of the reference signal SLP_ADC and the pixel signal voltage Vx_0 is performed by the voltage comparing units 252. At a fiftieth count when a reset level Srst_1 of the pixel signal voltage Vx_1 and the reference signal SLP_ADC coincide with each other, the comparison output COMP (=COMPOUT1) of the voltage comparing units 252 is inverted. Moreover, the count enable signal EN (=PCOMPOUT1) is also inverted (COMPOUT0 and PCOMPOUT0 are anti-phase). The counter units 254 start the down-count from this point and stop the count operation at a Drm=128th count. Therefore, since the counter units 254 down-count "128−50=78", "−78" is held in the counter units 254 after the P phase processing is finished.

In the Drm+Dsm=128+4096 count period prepared as the D phase processing period, comparison of the reference signal SLP_ADC and the pixel signal voltage Vx_1 is performed by the voltage comparing units 252. At the 2000th count when a signal level Ssig_1 of the pixel signal voltage Vx_1 and the reference signal SLP_ADC coincide with each other, the comparison output COMP (=COMPOUT1) of the voltage comparing units 252 is inverted. Moreover, the count enable signal EN (=PCOMPOUT1) is also inverted (the COMPOUT0 and PCOMPOUT0 are anti-phase). The counter units 254 starts the up-count from this point and stops the count operation at Drm+Dsm=128+4096th count.

Therefore, the counter units 254 up-count "128+4096−2000"=2224" clocks. At this point, since the up-count is performed from the count value "−78" obtained in the P phase processing, "−78+2224"=2146 is held in the counter units 254. Data Dout of the count value 2146 is transferred to the digital arithmetic unit 29. The digital arithmetic unit 29 subtracts the data Dout from the maximum count number Dsm corresponding to a maximum value of the signal data Dsig to acquire "4096−2146"=1950 as final signal data Dsig.

For both the pixel signal voltage Vx_0 and the pixel signal voltage Vx_1, during the D phase processing, the count-phase adjusting units 260 latch the comparison output COMP of the voltage comparing units 252 with a clock signal CLK, which rises near, for example, an intermediate voltage in a slope period of the reference signal SLP_ADC, corresponding to a threshold for dividing a low luminance range and a high luminance range. The count-phase adjusting units 260 performs phase adjustment for deciding whether, during processing for the next row, the comparison output COMP is normally outputted to be the count enable signal EN or inversely outputted to be the count enable signal EN. If timing when the CLK signal for dividing the low luminance range and the high luminance range rises is set at the intermediate voltage of the reference signal SLP_ADC, an activation period of the counter unit 254 does not become longer than a half of the slope period of the reference signal SLP_ADC.

When the signal level Ssig of the pixel signal voltage Vx during the D phase processing in the row belongs to the low luminance range, the comparison output COMP of the voltage comparing units 252 is inverted and is at the L level at the point of rising of the clock signal CLK. Therefore, the count-phase adjusting units 260 latch the L level as phase information of the comparison output COMP. Conversely, when the signal level Ssig of the pixel signal voltage Vx during the D phase processing in the row belongs to the high luminance range, the comparison output COMP of the voltage comparing units 252 is not inverted and is at the H level at the point of rising of the clock signal CLK. Therefore, the count-phase adjusting units 260 latch the H level as phase information of the comparison output COMP.

The comparison pulse COMP is inputted to one input terminals of the EX-OR gates and latch information in the row is inputted to the other input terminals as a phase adjustment control signal. The phase adjustment control signal is at the L level when the signal level Ssig belongs to the low luminance range and is at the H level when the signal level Ssig belongs to the high luminance range. In this way, when the signal level Ssig belongs to the low luminance range in the row, during processing in the next row, the comparison pulse COMP is outputted as the count enable signal EN without being logically inverted. Therefore, the former half count operation (the first processing example) is applied to the processing. When the signal level Ssig belongs to the high luminance range in the row, during the processing in the next row, the comparison pulse COMP is logically inverted and outputted as the count enable signal EN. Therefore, the latter half count operation (the second processing example) is applied to the processing.

As in this example, when data correction involved in a complement count operation is performed by the digital arithmetic unit 29, the phase information of the comparison output COMP latched by the count-phase adjusting unit 260 is notified to the digital arithmetic unit 29 through the horizontal signal lines 18 and 18x. The digital arithmetic unit 29 applies, on the basis of this information, the data correction involved in the complement count operation to pixel data subjected to the complement count.

<Operations of the Solid-State Imaging Device; Operations in a Third Processing Example>

Although not shown in the figure, in a third processing example, when the AD conversion system called the reference signal comparison type or the like is adopted, a mechanism that can perform a differential processing function simultaneously with AD conversion while preventing a problem of an increase in an area of the counter units 254 is adopted.

In terms of a circuit configuration, rather than the mechanism that switches a count mode, a mechanism that performs counting in an identical count mode during AD conversion processing in the first time and AD conversion processing in the second time and sets count phases in the first time and the second time different is adopted. As in the first processing example and the second processing example, during the count processing in the second time, the count processing is started from a result of the count processing in the first time.

In the third processing example, since it is unnecessary to switch a count mode, as a circuit configuration, it is possible to adopt the first configuration example shown in FIG. 2A or adopt the second configuration example shown in FIG. 2B.

"Set count phases different" means that count processing periods are set different in AD conversion processing in the first time (e.g., processing in the P phase) and AD conversion processing in the second time (e.g., processing in the D phase). More specifically, there is a difference between count processing performed in a period from a point when a change in the reference signal SLP_ADC is started until the reference signal SLP_ADC and the pixel signal voltage Vx become identical and count processing performed in a period from the point when the reference signal SLP_ADC and the pixel signal voltage Vx become identical to a point when the processing reaches a maximum AD conversion period in that processing (usually, a point when the change in the reference signal SLP_ADC is stopped). This difference means the difference between the count phases.

In other words, in the two times of count processing, with a point when the comparison output COMP is inverted as a boundary, real number count processing as the former half count operation and complement count processing as the latter half count operation are combined.

In general, the period from the point when a change in the reference signal SLP_ADC is started until the reference signal SLP_ADC and the pixel signal voltage Vx become identical and the period from the point when the reference signal SLP_ADC and the pixel signal voltage Vx become identical to the point when the processing reaches the maximum AD conversion period in that processing correspond to an output level of the comparison pulse COMP outputted from the voltage comparing unit 252. Therefore, count processing started in a period in which the comparison pulse COMP is at the L level and count processing started in a period in which the comparison pulse is at the H level only have to be switched.

In addition, in the third processing example, to make it possible to acquire a differential processing result as results of two times of count processing, as a first method, when count processing in the first time is started, a count value equivalent to a maximum AD conversion period in count processing performed after the point when the reference signal SLP_ADC and the pixel signal voltage Vx become identical is affixed with a sign (plus or minus) corresponding to a count mode and initially set as an initial value Dini. The count processing is started from the initial value Dini. Alternatively, as a second method, while count processing is started from "0" as in the first processing, after count processing in the second time is completed, the initial value Dini is corrected by the digital arithmetic unit 29 at the post-stage of the counter units 254. The first method is a method suitable when it is unnecessary to correct the initial value Dini at the post-stage of the counter units 254 and an AD conversion processing result for one pixel only has to be obtained. On the other hand, the second method is a method suitable when an AD conversion processing result of multiply-accumulate of signal components Vsig of plural pixels is obtained.

In other words, in the third processing example, when the other is allocated to count processing for the signal level Ssig, the count processing for the signal level Ssig may be considered an operation for counting complements. In this case, since complements are counted, a mechanism for data correction for obtaining final data as a real number is necessary. The mechanism for data correction can be realized by an initial value in the count processing in the first time or can be realized by a digital arithmetic operation in the digital arithmetic unit 29, which is a post-stage circuit.

<Operations of the Solid-State Imaging Device; Operations in a Fourth Processing Example>

Figure 3C:
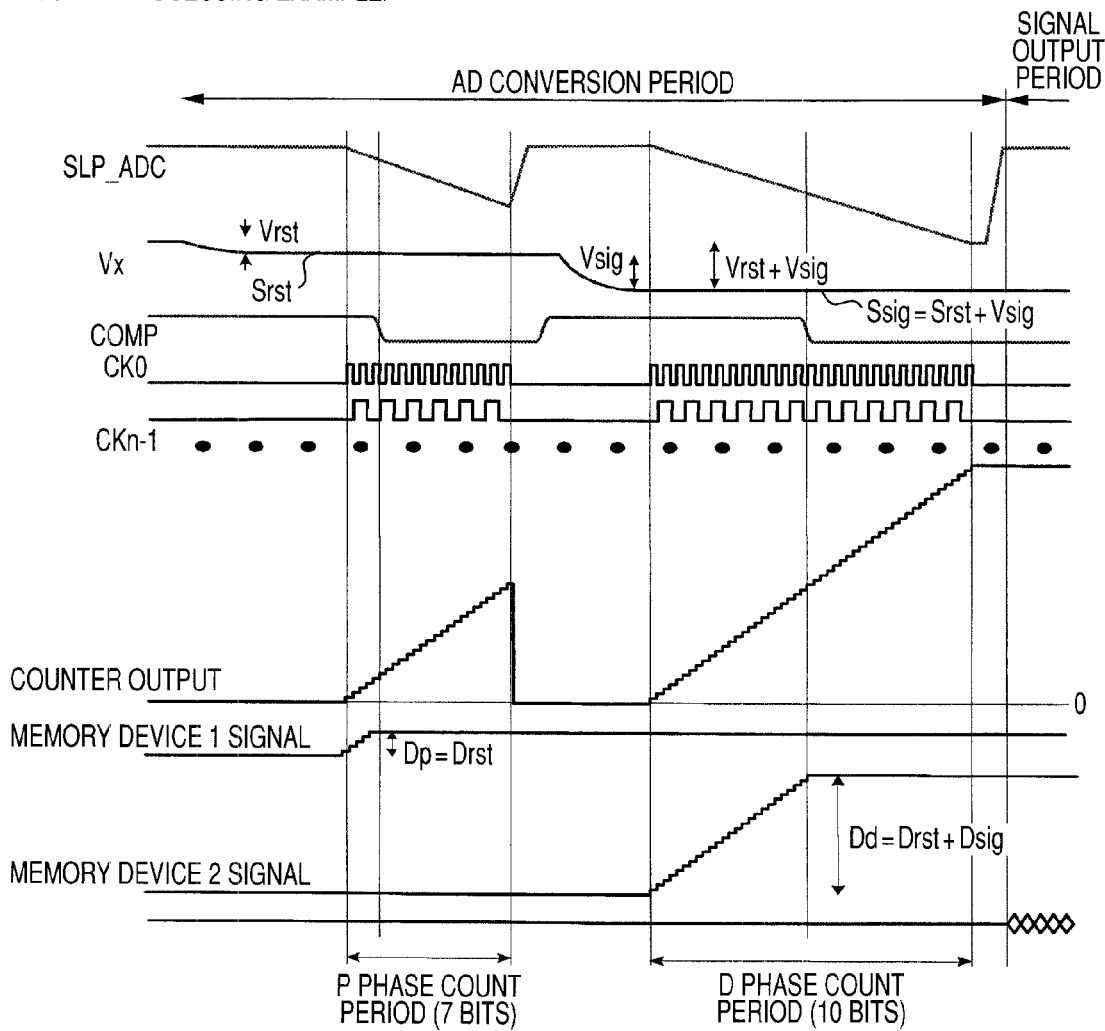
FIG. 3C is a timing chart for explaining operations in a fourth processing example of the AD conversion of the reference signal comparison type.

FIG. 3C is a timing chart for explaining operations in a fourth processing example of the AD conversion of the reference signal comparison type.

The fourth processing example corresponds to differential processing between a reset level and a signal level performed at a post-stage (e.g., the digital arithmetic unit 29) of the column circuits 25.

In this case, while only one of the down-count operation and the up-count operation is performed, during both the two times of processing, counting is started at a point when a change in the reference signal SLP_ADC is started and the counting is finished at a point when the reference signal SLP_ADC and a processing object signal voltage coincide with each other. Alternatively, counting is started at the point when the reference signal SLP_ADC and the processing object signal voltage coincide with each other and the counting is finished at a point when the processing reaches a desired count number in that processing (typically, a point when the processing reaches a maximum AD conversion period).

In the fourth processing example, since it is unnecessary to switch a count mode, as a circuit configuration, the first configuration example shown in FIG. 2A can be adopted or the second configuration example shown in FIG. 2B can be adopted. When the first configuration example is adopted, for example, both the counter units 254 and the data storing/transferring and outputting units 256 only have to be adapted to store the respective data Dp and Dd acquired in the processing in the P phase and the processing in the D phase in different storing units in the inside thereof.

In FIG. 3C, the second configuration example shown in FIG. 2B is adopted. After readout of the P phase level (the reset level Srst) of vertical signal lines 19_1 to 19_h from the pixel units 3 in an arbitrary row Vx is stabilized, the reference-signal generating unit 27 starts a change with time of the reference signal SLP_ADC supplied to the voltage comparing units 252 in the respective columns and the counter units 254 starts the up-count and compares a count with the reset level Srst for each of the columns. The comparison output COMP is inverted when the reset level Srst and the reference signal SLP_ADC coincide with each other. Therefore, the data storing/transferring and outputting units 256 capture count data at timing of the inversion and store the count data in a storing unit (a memory device 1) for P phase data Dp.

Moreover, after readout of the D phase level (the signal level Ssig) is stabilized, the reference-signal generating unit 27 starts a change with time of the reference signal SLP_ADC supplied to the voltage comparing units 252 in the respective columns and the counter units 254 start the up-count and compare counts with the signal level Ssig for each of the columns. The comparison output COMP is inverted when the signal level Ssig and the reference signal SLP_ADC coincide with each other. Therefore, the data storing/transferring and outputting units 256 capture count data at timing of the inversion and store the count data in a storing unit (a memory device 2) for D phase data Dd.

After the AD conversion period ends, the n-bit digital data Dp and Dd in the P phase and the D phase stored by the data storing/transferring and outputting units 256 are sequentially transferred to the digital arithmetic unit 29 through the 2*2*n horizontal signal lines 18 and 18x as complementary data Qp, xQp, Qd, and xQd, respectively, under the control by the horizontal scanning unit 12. In other words, the column circuits 25 output count results of the processing in the respective times to the digital arithmetic unit 29 as the complementary data Qp and xQp concerning the reset level Srst and the complementary data Qd and xQd concerning the signal level Ssig. The digital arithmetic unit 29 reproduces the original digital data Dp on the basis of the complementary data Qp and xQp and reproduces the original digital data Dd on the basis of the complementary data Qd and xQd. Thereafter, the digital arithmetic unit 29 performs differential processing of "Dd−Dp" using the reproduced data Dp and Dd to acquire AD conversion data Dsig concerning the signal component Vsig. Thereafter, the same operations are sequentially repeated for each of the rows, whereby a two-dimensional image is created.

<Problems of the Horizontal Transfer>

The data stored by the data storing/transferring and outputting units 256 in the respective columns are sequentially transferred to the output circuit 28 (or the digital arithmetic unit 29) side through the horizontal signal lines 18, which are bus lines, as single end information. In this case, since the parasitic capacitance is present in the horizontal signal lines 18, various problems due to the presence of the parasitic resistance occur. For example, deterioration in transfer speed occurs and a chip size increases because the width of wiring (the width of metal) used for the horizontal signal lines 18 for controlling the parasitic capacitance has to be increased.

For example, a value of the parasitic capacitance is a value obtained by totaling:

(1) a capacitance due to the horizontal signal lines 18;

(2) a capacitance due to an input stage of the output circuit 28;

(3) a capacitance due to an output stage of one data storing/transferring and outputting unit 256×a total number of data storing/transferring and outputting units 256; and (4) a capacitance of wiring for connecting the horizontal signal lines 18 and the output stage of one digital storing/transferring and outputting unit 256×the total number of data storing/transferring and outputting units 256.

Therefore, when the data stored by the data storing/transferring and outputting units 256 in the respective columns are read out to the horizontal signal lines 18 by sequentially selecting the data storing/transferring and outputting units 256, a fault occurs in data transfer because of the parasitic capacitance of the horizontal signal lines 18. In particular, when a capacitance value of the parasitic capacitance increases, this causes a signal delay and prevents an increase in speed of data transfer.

For example, when a high-speed operation is performed to, for example, increase a frame rate, it is necessary to perform operations such as row scanning, AD conversion, and horizontal data transfer at high speed. Among the operations, when it is desired to increase speed of the horizontal data transfer, time until the data storing/transferring and outputting unit 256 selected by the horizontal scanning unit 12 drives the horizontal signal lines 18 and a signal of the data storing/transferring and outputting unit 256 reaches the output circuit 28 is predominant.

In the case of the pixel array unit 10 having pixels in the horizontal direction, for example, the unit pixels 3 in 2000 columns, 2000 data storing/transferring and outputting units 256 are connected to the horizontal signal lines 18. Parasitic capacitances of respective output stages of the data storing/transferring and outputting unit 256 are combined. The selected data storing/transferring and outputting unit 256 drives the horizontal signal lines 18 with the large capacitance as a load. In recent years, since there is a demand for an increase in pixels, the number of data storing/transferring and outputting units 256 connected to the horizontal signal lines 18 tends to increase. This tendency limits a high-speed operation particularly demanded.

As a method of solving such a problem, a method of increasing the width of wiring used for the horizontal signal lines 18 in order to decrease a parasitic resistance and control a wiring delay due to a parasitic capacitance is conceivable. However, to transfer data by bit through the horizontal signal lines 18 serving as bus lines, a chip size increases.

Therefore, in this embodiment, a mechanism that digitally converts a pixel signal and outputs the pixel signal to the outside of the solid-state imaging device 1 is provided. With the mechanism, it is possible to solve the problems due to a parasitic capacitance of horizontal signal lines. The basics of the mechanism reside in transferring data on the horizontal signal lines as complementary information rather than transferring the data on the horizontal signal lines as single end information. This mechanism is specifically explained below.

<Configurations of the Data Storing/Transferring and Outputting Units and the Output Circuit>

Figure 4A:
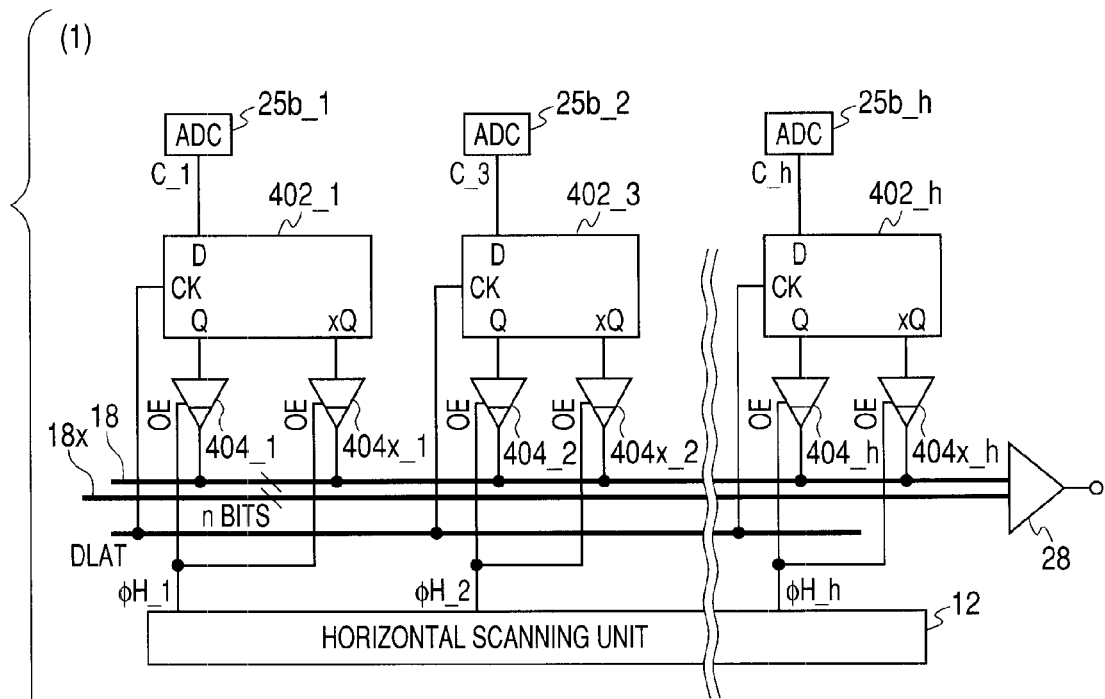
FIG. 4A is a circuit block diagram showing details of a data storing/transferring and outputting unit.
Figure 4A:
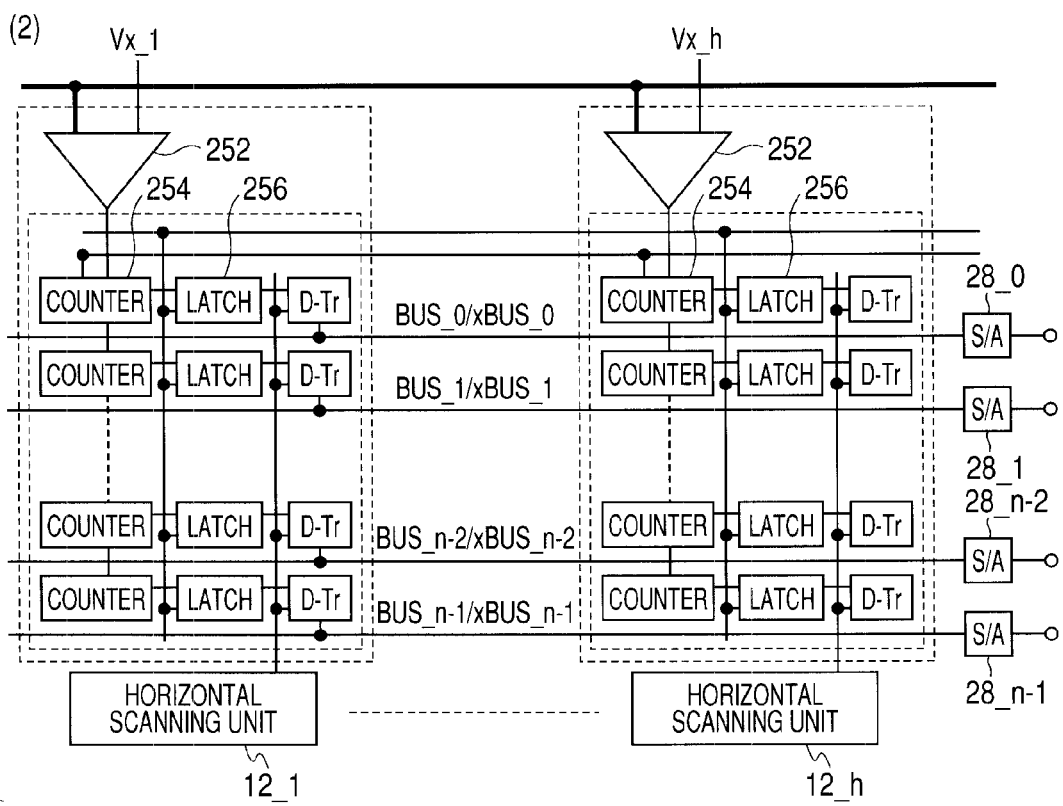
Figure 4B:
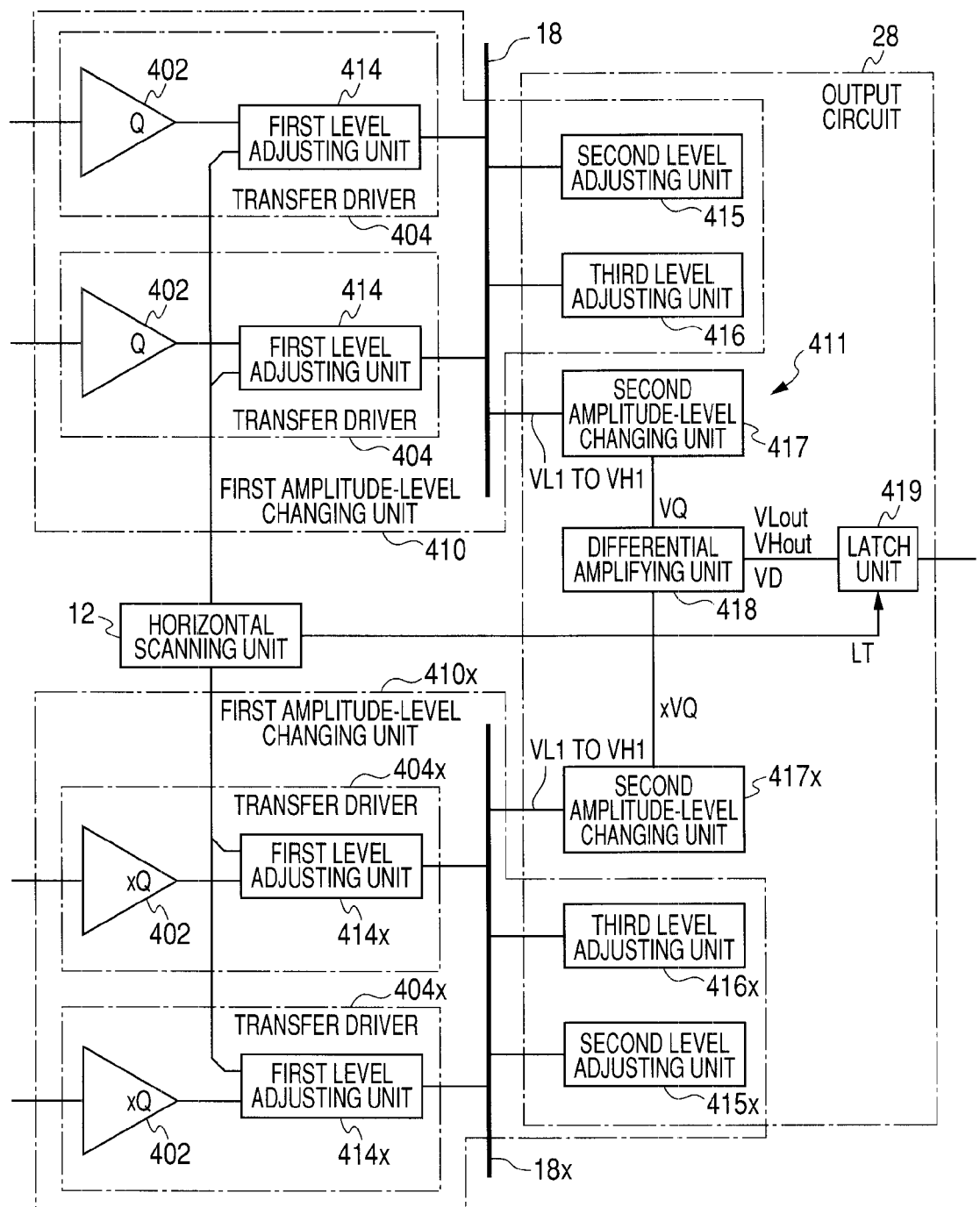
FIG. 4B is a circuit block diagram showing a configuration example of the periphery of the data storing/transferring and outputting unit and an output circuit.

FIGS. 4A to 4C are diagrams for explaining a configuration example of the column processing unit 26 (in particular, the units around the data storing/transferring and outputting units 256) and the output circuit 28. FIG. 4A is a circuit block diagram showing details of the data storing/transferring and outputting units 256. FIG. 4B is a circuit block diagram showing a configuration example of the units around the data storing/transferring and outputting units 256 and the output circuit 28. FIG. 4C is a voltage level chart for explaining basic operations of the units around the data storing/transferring and outputting units 256 and the output circuit 28.

In the solid-state imaging device 1 according to this embodiment, as a mechanism for realizing high-speed transfer of data without being affected by the parasitic capacitance of the horizontal signal lines 18, data on H and L logic levels outputted from data holding function units of the respective data storing/transferring and outputting units 256 are converted into complementary data Qsig and xQsig, transferred on the horizontal signal lines 18 and 18x for the data, and re-converted into original data D of the logic levels by the output circuit 28 rather than being directly outputted to the horizontal signal lines 18 via transfer drivers.

As a basic structure for the mechanism, as shown in FIG. 4A (1), the data storing/transferring and outputting units 256 includes D-type flip-flops (D-FFs) 402 as an example of the data holding units that captures data from the AD conversion units 25b of the column circuits 25, which are inputted to D input terminals in synchronization with sub-clocks DLAT inputted to the clock terminals CK, and hold the data and transfer drivers 404 and 404x as an example of bus driving circuits (data output stages) as transfer output function units.

Non-inverted outputs Q of the D-type flip-flops 402 are inputted to the transfer drivers 404. Outputs of the transfer drivers 404 are connected to the output circuit 28 through the horizontal signal lines 18, which are bus lines. On the other hand, inverted outputs xQ of the D-type flip-flops 402 are inputted to the transfer drivers 404x. Outputs of the transfer drivers 404x are connected to the output circuit 28 through the horizontal lines 18x, which are bus lines.

To output enable terminals OE of the respective transfer drivers 404_1 to 404_h and 404x_1 to 404x_h, horizontal data transfer clocks φH_1 to φH_h corresponding thereto are inputted from the communication/timing control unit 20. The respective transfer drivers 404_1 to 404_h and 404x_1 to 404x_h transfer inputted information to the output circuit 28 through the horizontal signal lines 18 and 18x when the horizontal data transfer clocks φH_1 to φH_h corresponding thereto are active (in this example, at the H (high) level) (i.e., the output enable terminals OE are at the H level).

As shown in FIG. 4A (2), the respective counter units 254_1 to 254_h have the structure of an asynchronous up/down counter and cascade-connect counter cells (e.g., D latches) 254_0 to 254_n−1 for n bits. "Cascade connection" means connection for inputting output data of a counter cell at a pre-stage to a clock terminal of a counter cell at a post-stage. The count clock CK_CNT is supplied to a clock terminal of the counter cell 254_0 at the pre-stage. The respective D-type flip-flops 402_1 to 402_h of the data storing/transferring and outputting units 256 have D latches by bit. The respective transfer drivers 404_1 to 404_h, 404x_1 to 404x_h have drive transistors (D-Tr). The counter cells, the D latches, and the drive transistors for n bits corresponding to a count number are connected in series.

The driver transistors are connected in parallel to the horizontal signal lines 18 and 18x (hereinafter also referred to as horizontal transfer busses BUS and xBUS) corresponding thereto and transfer the complementary data Q and xQ from the respective D latches, which selectively output count data by bit, using the horizontal scanning unit 12.

The solid-stage imaging device 1 includes, at a post-stage of the D-type flip-flops (D-FFs) 402, first amplitude-level changing units 410 and 410x that change one of H (power supply side) and L (ground side) logic levels, which are outputted from the D-type flip-flops 402, to a third voltage level between a power supply and the ground, a main amplifying unit 411 that amplifies complementary information, amplitude levels of which are changed by the first amplitude-level changing units 410 and 410x, and a latch unit 419 that holds output information (a comparison result) of the main amplifying unit 411 at predetermined timing. The latch unit 419 is an example of a data holding unit that captures information outputted from the differential amplifying unit 418 and holds the information at predetermined timing. A control pulse (latch clock) LT defining timing for holding the output information (the comparison result) of the main amplifying unit 411 is supplied to the latch unit 419 from the horizontal scanning unit 12.

It is assumed that a latch clock LT synchronizes with the horizontal data transfer clock φH. More specifically, a control pulse is set such that the latch unit 419 holds the output information (the comparison result) of the main amplifying unit 411 in a position generally in the middle in a transfer cycle defined by the horizontal data transfer clock φH.

As shown in FIG. 4B, the main amplifying unit 411 includes second amplitude-level changing units 417 and 417x functioning as complementary signal amplifying units that amplify information, an amplitude level of which is changed by the first amplitude-level changing units 410 and 410x, and the differential amplifying unit 418 that compares and amplifies outputs of the second amplitude-level changing units 417 and 417x. Data Q on the horizontal transfer bus BUS and data xQ on the horizontal transfer bus xBUS are inverted data (complementary data). The second amplitude-level changing units 417 and 417x have an identical structure. The main amplifying unit 411 and the latch unit 419 are provided in the output circuit 28 provided with respect to the horizontal transfer buses BUS and xBUS common to the respective columns.

The first amplitude-level changing units 410 and 410x include, in the transfer drives 404 and 404x in the respective columns, first level adjusting units 414 and 414x that convert one of H (power supply side) and L (ground side) logic levels, which are outputted from output terminals Q and xQ of final-stage amplifiers of the D-type flip-flops 402, to a third voltage level between the power supply and the ground.

The first amplitude-level changing units 410 and 410x also includes second level-adjusting units 415 and 415x that convert the other of the H and L logic levels, which are outputted from the D-type flip-flops 402, into a fourth voltage level between the power supply and the ground and third level-adjusting units 416 and 417x that control overcharge at the fourth voltage level converted by the second level adjusting units 415 and 415x and limit a maximum value of the fourth voltage level to a fifth voltage level between the power supply and the ground. The second level adjusting units 415 and 415x and the third level adjusting units 416 and 417x are provided in the output circuit 28 provided with respect to the horizontal transfer buses BUS and xBUS common to the respective columns.

For example, as shown in FIG. 4C, the first level adjusting units 414 and 414x change the H logic level, which is outputted from the D-type flip-flops 402, to a third voltage level VL3 between the power supply and the ground. In response to this change, the second level adjusting units 415 and 415x change the L logic level, which is outputted from the D-type flip-flops 402, to a fourth voltage level VH4 (>VL3) between the power supply and the ground.

In this way, the transfer drivers 404 and 404x (in particular, the first level adjusting units 414 and 414x) and the second level adjusting units 415 and 415x according to this embodiment have the inverted structure. As shown in FIG. 4C, data ((1) in the figure) of binary logic levels at general voltage level VL (equivalent to a ground potential) and VH (equivalent to a power supply potential for a logic circuit) from the D-type flip-flops 402 are converted into analog voltage signals with narrow voltage amplitude (VL3 to VH4) and outputted to the horizontal transfer buses BUS and xBUS ((2) in the figure). This is for the purpose of, in driving of the high-load horizontal transfer buses BUS and xBUS, in the viewpoint of high-speed data transfer, making transfer of information more advantageous in terms of driving ability, power consumption, anti-noise performance, and the like than transfer of information to the output circuit 28 through the horizontal transfer buses BUS and xBUS while keeping the original VL and VH logic levels.

The second amplitude-level changing units 417 and 417x of the output circuit 28 receive voltage information (VL3 to VH4) on the horizontal transfer buses BUS and xBUS converted into narrow analog signals with voltage amplitudes (VL3 to VH4) from logic levels by the transfer drivers 404 and 404x (in particular, the first level adjusting units 414 and 414x) and the second level adjusting units 415 and 415x. Then, the second amplitude-level changing units 417 and 417x convert (invert and amplify) the voltage information into voltage information VQ and xVQ for the differential amplifying unit 418 with amplitude levels VL6 to VH6 wider than VL3 to VH4 and output the voltage information ((3) in the figure).

The third level-adjusting units 416 and 417x have a function of, when the complementary data Q and xQ are at the L level and the first level-adjusting units 414 and 414x are not driven, limiting a maximum charging potential at the time when the horizontal transfer buses BUS and xBUS are charged by the fourth voltage level VH4, which is converted by the second level adjusting unit 415 and 415x, to a fifth voltage level VH5 to control overcharging to a power supply level.

For example, as shown in FIG. 4C (4), the differential amplifying unit 418 compares, using a voltage comparator, whether the voltage information VQ on the horizontal transfer BUS is higher or lower than the voltage information xVQ on the horizontal transfer bus xBUS on the basis of the voltage information VQ and xVQ that change in opposite polarities at amplitude levels VL6 to VH6. The differential amplifying unit 418 amplifies, using an amplifying function of the voltage comparator (when necessary, cooperative processing with an output buffer), a voltage difference between the voltage information VQ and the voltage information xVQ to logic level VLout and VHout for the latch unit 419.

When information is transferred on the horizontal signal lines 18 at a single end, since the horizontal signal lines 18 as the horizontal transfer paths are long, transfer speed is limited by the parasite CR. When pipeline processing for performing a count operation for AD conversion and a horizontal transfer operation in parallel is adopted to increase speed of operations, power supply noise during a counter operation is mixed in the horizontal transfer paths and limit an increase in speed of the transfer.

On the other hand, in this embodiment, rather than being transferred on the horizontal signal lines 18 while a logic output level of the latch circuit (in this example, the D-type flip-flops 402) is kept, the data is transferred as complementary information and converted into voltage signals with smaller amplitude, transmitted to the output circuit 28, and reproduced to be a logic level for a post-stage circuit again in the output circuit 28. The data is transferred on the horizontal signal lines 18 and 18x as complementary and small-amplitude voltage signals. As a result, high-speed horizontal transfer is realized. Since the complementary information is transferred, even if common mode noise such as power supply noise is mixed in the horizontal transfer paths, the influence of the noise can be cancelled. Therefore, transfer errors can be remarkably reduced. In particular, when digital data is transferred as complementary data, the original data is reproduced on the basis of the transferred complementary data and, then, latched at predetermined timing. This also makes it possible to remarkably improve data accuracy. A specific configuration example is explained below.

<Configuration Example>

Figure 5A:
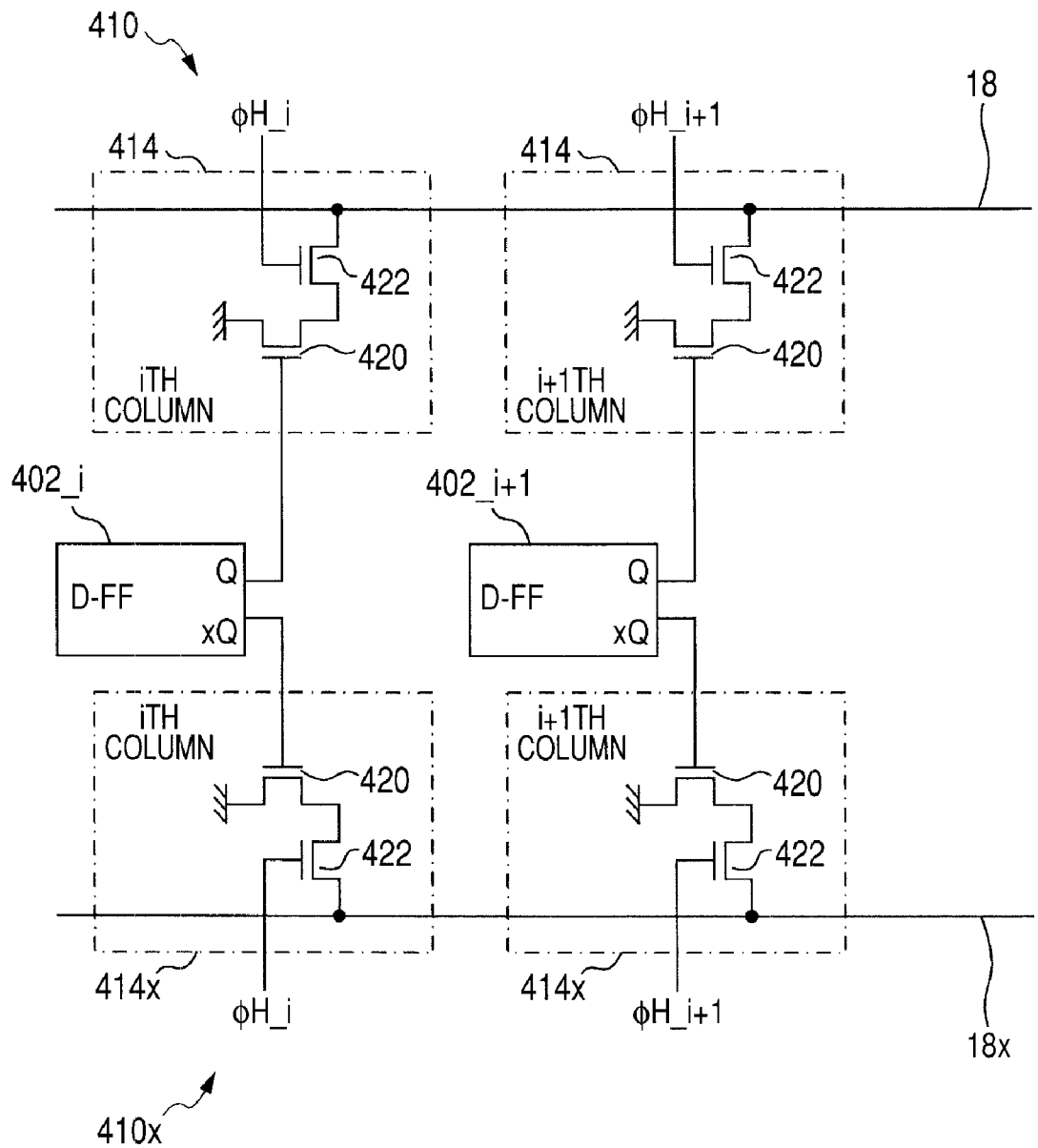
FIG. 5A is a diagram for explaining a specific configuration example.
Figure 5B:
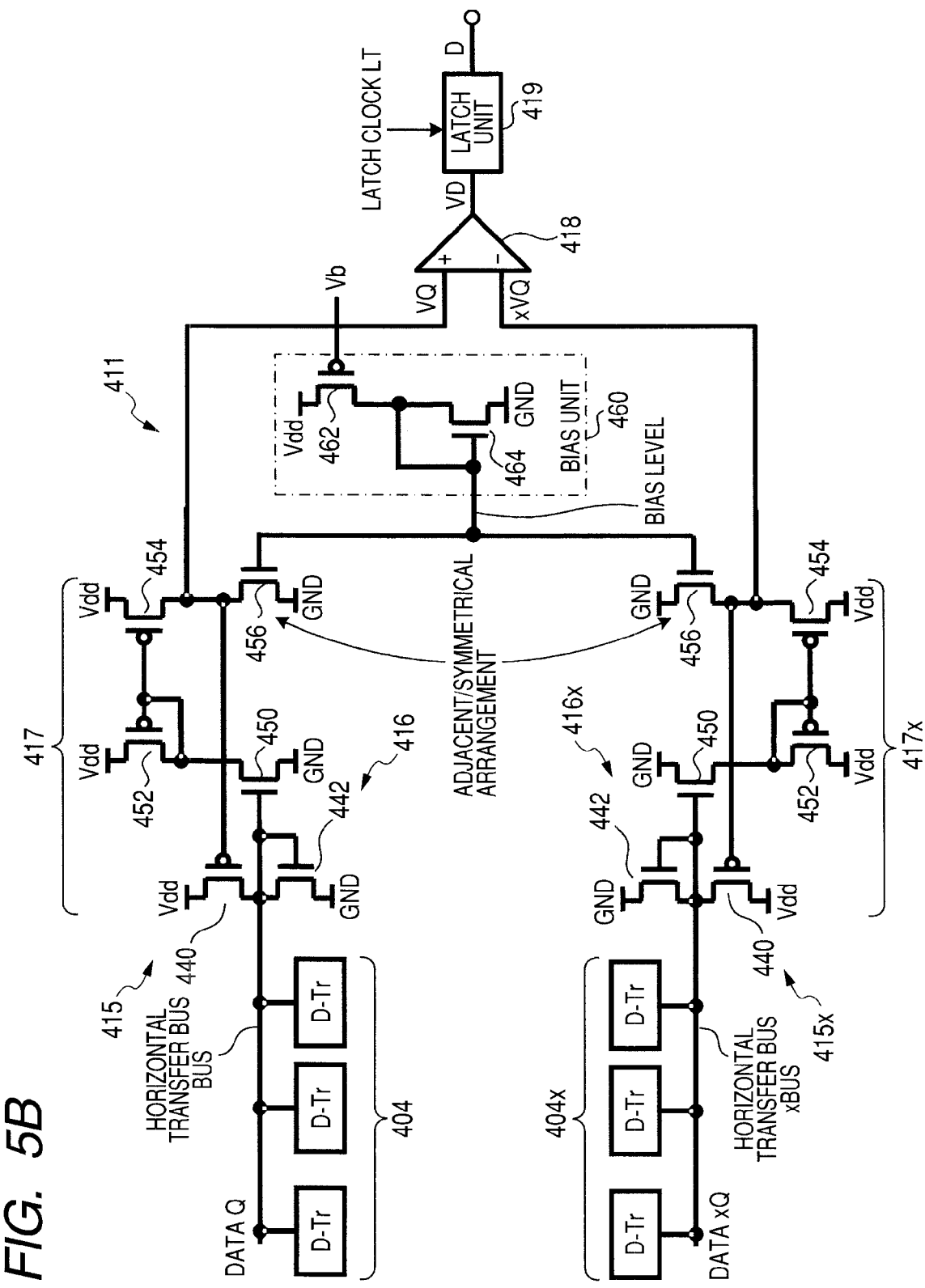
FIG. 5B is a diagram for explaining a specific configuration example.

FIGS. 5A and 5B are diagrams for explaining a specific configuration example. As shown in FIG. 5A, the first level adjusting units 414 and 414x of the data storing/transferring and outputting unit 256 have, between the output terminals Q and xQ of the D-type flip-flops 402 and the horizontal transfer buses BUS and xBUS, NMOS transistors 420 functioning as drive transistors (D-Trs) and NMOS transistors 422 functioning as switch transistors having an analog switch function.

Horizontal data transfer clocks φH_1 to φH_h corresponding to columns from the horizontal scanning unit 12 are supplied to gate terminals of the NMOS transistors 422. The NMOS transistors 422 output inverted outputs of the NMOS transistors 420 to the horizontal transfer buses BUS and xBUS common to the respective columns under the control by the horizontal scanning unit 12.

Output data of the output terminals Q and xQ of the D-type flip-flops 402 are inputted to gate terminals of the NMOS transistors 420. Source terminals of the NMOS transistors 420 are grounded. Drain terminals of the NMOS transistors 420 are connected to one input and output terminals (e.g., source terminals) of the NMOS transistors 422.

When the NMOS transistors 422 are on, the NMOS transistors 420 logically invert and convert the H (power supply side) logic level of output data of the output terminals Q and xQ of the D-type flip-flops 402 into the third voltage level VL3 between power supply and the ground.

The second level adjusting units 415 and 415x that logically invert and convert the L (ground side) logic level of the L and H logic levels outputted from the output terminals Q and xQ of the D-type flip-flops 402 into the fourth voltage level VL4 are connected to the horizontal transfer buses BUS and xBUS. In this configuration example, as the second level adjusting units 415 and 415x, those functioning as means for pulling up potentials of the horizontal transfer buses BUS and xBUS are used.

Specifically, the second level adjusting units 415 and 415x functioning as pull-up means perform pull-up using PMOS transistors in order to pull the horizontal transfer buses BUS and xBUS to a power supply voltage Vdd side when outputs of the first level adjusting units 414 and 414x are inactive (equivalent to the time when the data Q and xQ are at the L level). For this purpose, the second level adjusting units 415 and 415x having PMOS transistors 440 are provided between the horizontal transfer buses BUS and xBUS and the power supply voltage Vdd. The power supply voltage Vdd is supplied to source terminals of the PMOS transistors 440. Drain terminals of the PMOS transistors 440 are connected to the horizontal transfer buses BUS and xBUS.

The third level adjusting units 416 and 417x limit over charging by the fourth voltage level VH4, which occur because a state in which outputs of the first level adjusting units 414 and 414x are inactive (equivalent to the time when the data Q and xQ are at the L level) continue, to the fifth voltage level VH5. As the third level adjusting units 416 and 417x, diode-connected NMOS transistors 442 are provided between the horizontal transfer buses BUS and xBUS and the ground to place anodes on the horizontal transfer buses BUS and xBUS side and place cathodes on a ground side.

The PMOS transistors 440 also perform a part of functions of the second amplitude-level changing units 417 and 417x. The second amplitude-level changing units 417 and 417x include NMOS transistors 450, gate terminals of which are connected to the horizontal transfer buses BUS and xBUS, current-mirror-connected PMOS transistors 452 and 454 provided on load sides (drain terminal sides) of the NMOS transistors 450, and NMOS transistors 456 provided on load sides (drain terminal sides) of the PMOS transistors 454.

The power supply voltage Vdd is supplied to respective source terminals of the PMOS transistors 452 and 454. Respective base terminals of the PMOS transistors 452 and 454 are connected in common and connected to drain terminals of the PMOS transistors 452. Source terminals of the NMOS transistors 450 are grounded. Drain terminals of the NMOS transistors 450 are connected to the drain terminals of the PMOS transistors 452 (and further connected to the respective gate terminals of the PMOS transistors 452 and 454). Source terminals of the NMOS transistors 456 are grounded. Drain terminals of the NMOS transistors 456 are connected to drain terminals of the PMOS transistors 454. Connection points of the drain terminals are connected to one of input terminals of the differential amplifying unit 418. The drain terminal of the NMOS transistor 456 of the second amplitude-level changing unit 417 is connected to a non-inverting input terminal (+) of the differential amplifying unit 418 and the drain terminal of the NMOS transistor 456 of the second amplitude-level changing unit 417x is connected to an inverting input terminal (−) of the differential amplifying unit 418.

Voltage information VQ and xVQ of the amplifier output terminals is also supplied to gate terminals (control input terminals) of the PMOS transistors 440. The voltage information VQ and xVQ amplified by the second amplitude-level changing units 417 is supplied to the control input terminals of the PMOS transistors 440, which are load transistors of the NMOS transistors 420. A feedback circuit that acts in a direction for controlling signal amplitudes on the horizontal transfer buses BUS and xBUS on the basis of the amplified signals (voltage information VQ and xVQ) is configured (details of operations of the feedback circuit are described later).

The main amplifying unit 411 has a bias unit 460 that defines operation currents of the NMOS transistors 456. The bias unit 460 includes a PMOS transistor 462, at a gate terminal of which a bias voltage Vb is set, and an NMOS transistor 464 provided on a load side (a drain terminal side) of the PMOS transistor 462. The power supply voltage Vdd is supplied to a source terminal of the PMOS transistor 462. A drain terminal of the PMOS transistor 462 is connected to a drain terminal of the NMOS transistor 464. A source terminal of the NMOS transistor 464 is grounded. A gate terminal and the drain terminal of the NMOS transistor 464 are connected.

The respective NMOS transistors 456 of the second amplitude-level changing units 417 and 417x are connected to the gate terminal of the NMOS transistor 464 of the bias unit 460 and current-mirror-connected to the NMOS transistor 464. In other words, a predetermined bias level is inputted to input sides (the gate terminals) of the NMOS transistors 456 from the bias unit 460 serving as a constant current source.

The voltage information VQ at the amplifier output terminal of the second amplitude-level changing unit 417 functioning as a xBUS amplifying unit is supplied to the non-inverting input (+) of the differential amplifying unit 418. The voltage information xVQ at the amplifier output terminal of the second amplitude-level changing unit 417x functioning as an xBUS amplifying unit is supplied to the inverting input (−) of the differential amplifying unit 418. The voltage information VQ and the voltage information xVQ are compared and amplified by the differential amplifying unit 418. Voltage information VD that assumes VLout corresponding to the L level of reproduced data and VHout corresponding to the H level of the data by being compared and amplified by the differential amplifying unit 418 is supplied to the latch unit 419. The latch unit 419 captures the voltage information VD in a position generally in the middle in a transfer cycle on the basis of a latch clock LT synchronizing with the horizontal data transfer clock φH to reproduce the original logic data D and output the logic data D in synchronization with the horizontal data transfer clock φH.

In view of the horizontal transfer of the digital data, final data is decided in the latch unit 419 to improve accuracy of data reproduction. However, it is not indispensable to provide the latch unit 419. In the horizontal transfer of analog information, without providing the latch unit 419, voltage information outputted from the differential amplifying unit 418 only has to be used as it is.

As it is evident from the figure, the second amplitude-level changing units 417 and 417x have the identical structure. The second amplitude-level changing units 417 and 417x preferably have identical performance such that the voltage information VQ and xVQ at the amplifier output terminals assume similar characteristics. For this purpose, for example, it is preferable to arrange the second amplitude-level changing units 417 and 417x in places close to each other. In particular, operation points of the second amplitude-level changing units 417 and 417x substantially depend on operation currents of the NMOS transistors 456. Therefore, it is preferable to arrange the NMOS transistor 456 on the second amplitude-level changing unit 417 side and the NMOS transistor 456 on the second amplitude-level changing unit 417x side in places close to each other.

The NMOS transistors 456 are current-mirror-connected to the NMOS transistor 464 of the bias unit 460. Therefore, in order to symmetrically arrange mirror circuits of the respective transistors, it is preferable to arrange the NMOS transistor 456 on the second amplitude-level changing unit 417 side and the NMOS transistor 456 on the second amplitude-level changing unit 417x side in symmetrical places across the NMOS transistor 464. The diagram (the circuit diagram) shown in the figure schematically show the arrangement. In the second amplitude-level changing units 417 and 417x, it is also preferable to arrange the respective transistors 440, 450, 452, 454, and 456 in close places.

In the structure of the second amplitude-level changing units 417 and 417x having the PMOS transistors 440 as pull-up means, when the output data Q and xQ in a certain column are "L", the PMOS transistors 440 are used to pull up voltages of the horizontal transfer buses BUS and xBUS to the power supply voltage Vdd side. When the output data Q and xQ in the certain column change to "H", the voltages are pulled down by the driven NMOS transistors 420 and the signal value "H" is logically inverted and transmitted. It goes without saying that, when the output data in the certain column are "L", since the NMOS transistors 420 are turned off, the signal value "L" is logically inverted and transmitted by the pull-up by the PMOS transistors 440.

When the output data Q and xQ in the certain column change to "H", the NMOS transistors 420 are turned on and the voltages of the horizontal transfer busses BUS and xBUS are pulled down and drop by a certain voltage to the third voltage level VH3 between the power supply voltage Vdd corresponding to the H level and the ground voltage GND corresponding to the L level. A degree of the voltage drop depends on driving ability between the drains and the sources of the NMOS transistors 420 (related to driving currents and output resistances between the drains and the sources) and load resistances and load capacitances on the horizontal transfer busses BUS and xBUS sides.

In configuring the first level adjusting units 414, the transistors (in this example, the NMOS transistors 420) that logically inverts the H and L logic levels outputted from the AD converting units 25b and the D-type flip-flops 402 are used. Therefore, there is an advantage that it is possible to easily convert one of the H and L logic levels (in this example, the H level) to the third voltage level VH3.

In specifically configuring the pull-up means for, when the output data Q and xQ in the certain column are "L", pulling up the voltages to the fourth voltage level VL4 between the power supply voltage Vdd corresponding to the H level and the ground voltage GND corresponding to the L level, if MOS transistors are used, there is an advantage that it is possible to realize the pull-up means in a small area compared with the form in which resistance elements are used. In addition, in the transition from the L level to the H level (logically inverted on the horizontal transfer buses BUS and xBUS; from the H level to the L level), the driving ability of the PMOS transistors 440 can be utilized. Therefore, the driving ability is also high compared with the resistance elements. However, when the NMOS transistors 420 are turned on, it is likely that a through current flows from the PMOS transistors 440 to the NMOS transistors 420 through the PMOS transistors 422.

<Amplification Action in the Configuration Example>

Figure 6A:
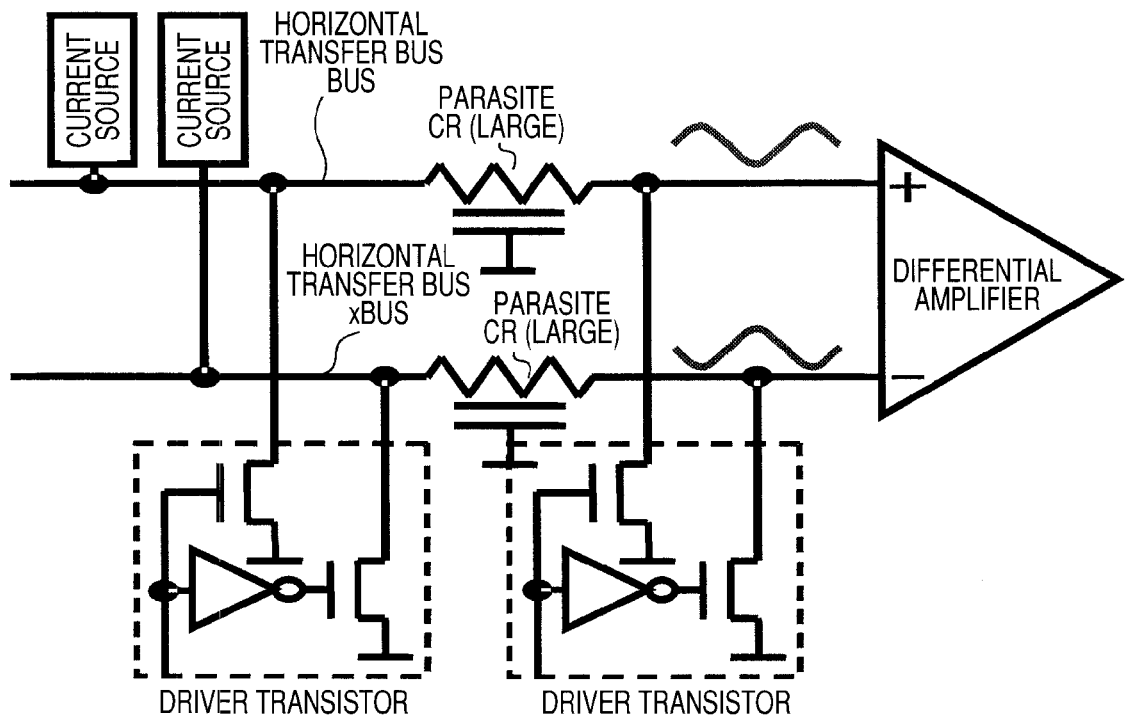
FIG. 6A is a diagram for explaining an operation according to a comparative configuration example shown in FIG. 5B.
Figure 6B:
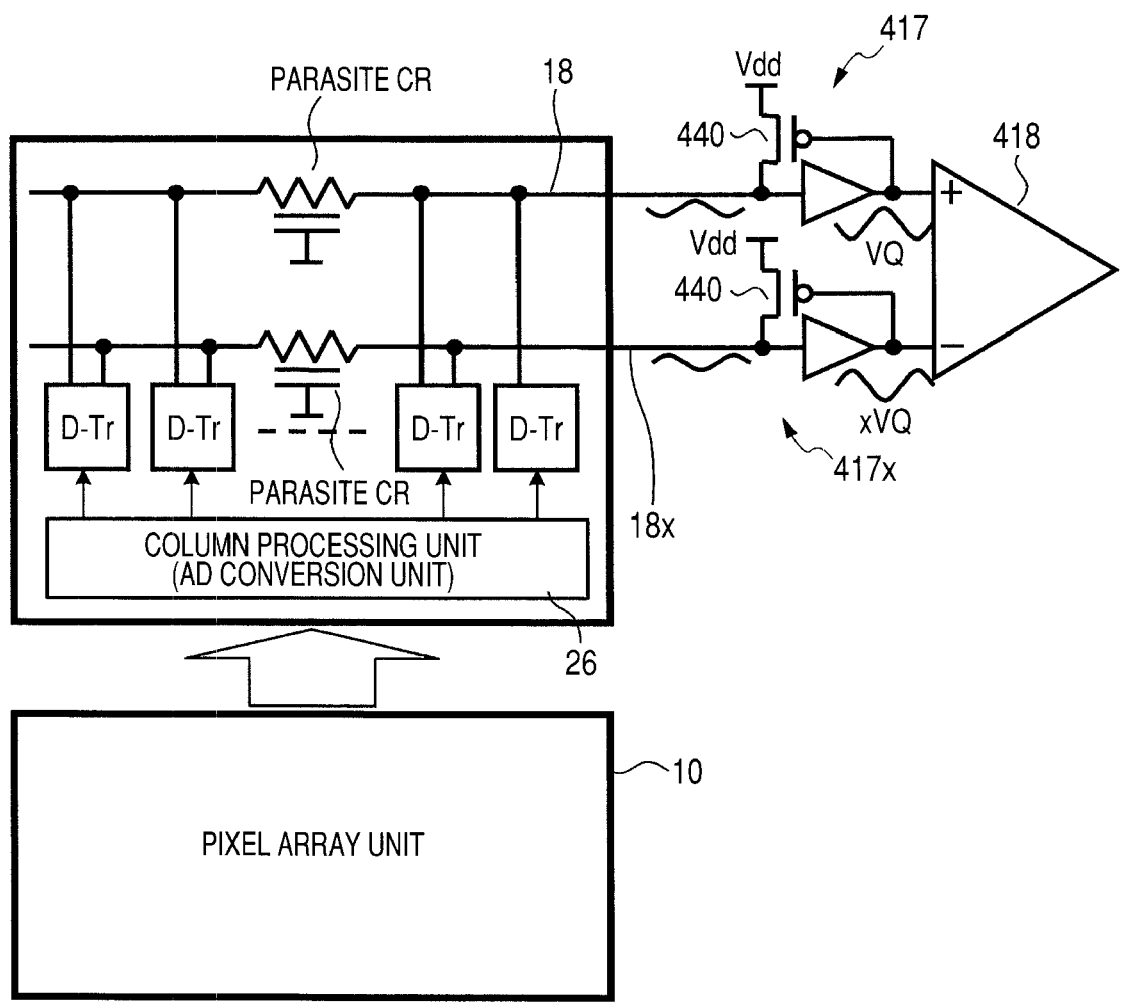
FIG. 6B is a diagram for explaining operations according to the embodiment to which the configuration example shown in FIG. 5B is applied.

FIGS. 6A and 6B are diagrams for explaining an amplification action of the second amplitude-level changing units 417 and 417x in the configuration example shown in FIG. 5B and functionally shows a circuit configuration. FIG. 6A is a diagram for explaining operations to which a comparative example for the configuration example shown in FIG. 5B is applied. FIG. 6B is a diagram for explaining operations according to this embodiment to which the configuration example shown in FIG. 5B is applied.

As shown in FIG. 6A, in the configuration of the comparative example, in order to perform data transfer on transfer paths (buses) with large parasite CR, as in this embodiment, a differential transfer circuit is used. In this differential transfer circuit, the transfer circuit is driven by load transistors (as current sources) for charging the transfer paths and drive transistors for complementary data and voltages are compared and outputted by differential amplifiers. However, in such a configuration of the comparative example, speed of transfer depends on ability of the load transistors and the drive transistors for charging and discharging in a DC balance. When the parasite CR of the transfer paths is large, speed of transfer on the transfer paths depends on this ability.

On the other hand, in the configuration example according to this embodiment shown in FIG. 5B, the second amplitude-level changing units 417 and 417x configure a feedback amplifier circuit. In other words, the connection points where the drain terminals of the PMOS transistors 454 and the drain terminals of the NMOS transistors 456 are connected are amplifier output terminals. The voltage information VQ and xVQ for differential amplifying unit 418 generated at the amplifier output terminals are returned to the gate terminals (the control input terminals) of the PMOS transistors 440. The PMOS transistors 440 configure a feedback circuit for controlling potential fluctuation in the horizontal transfer buses BUS and xBUS on the basis of gate voltages at the gate terminals.

When the logic data Q and xQ outputted from the D-type flip-flops 402 are at the L level, the NMOS transistors 420 turns off to act in a direction for increasing potentials of the horizontal transfer buses BUS and xBUS with the pull-up action of the PMOS transistors 440. Then, the NMOS transistors 450 act in an ON direction and electric currents of the current-mirror-connected PMOS transistors 452 and 454 increase. This current increase acts in a direction for increasing the voltage information VQ and xVQ generated at the amplifier output terminals. The information is notified to the gate terminals of the PMOS transistors 440. When potentials at the gate terminals rise, since the PMOS transistors 440 act in an OFF direction, operation resistances increase. As a result, the PMOS transistors 440 act in a direction for reducing the potentials of the horizontal transfer buses BUS and xBUS. In other words, when the potentials of the horizontal transfer buses BUS and xBUS rise (amplitudes increase), the PMOS transistors 440 are inputted with the voltage information VQ and xVQ at the amplifier output terminals of the second amplitude-level changing units 417 and 417x and act in a direction for controlling an increase in amplitude of the horizontal transfer buses BUS and xBUS.

Conversely, when the logic data Q and xQ outputted from the D-type flip-flops 402 are at the H level, the NMOS transistors 420 are turned on to be pulled down and act in a direction for reducing the potentials of the horizontal transfer buses BUS and xBUS. Then, the NMOS transistors 450 act in an OFF direction and the electric currents of the current-mirror-connected PMOS transistors 452 and 454 decrease. This current decrease acts in a direction for lowering the voltage information VQ and xVQ generated at the amplifier output terminals. The information is notified to the gate terminals of the PMOS transistors 440.

When the potentials at the gate terminals fall, the PMOS transistors 440 act in an ON direction. Therefore, the operation resistances decrease and the PMOS transistors 440 act in a direction for increasing the potentials of the horizontal transfer buses BUS and xBUS. In other words, when the potentials of the horizontal transfer buses BUS and xBUS fall (amplitudes decrease), the PMOS transistors 440 are inputted with the voltage information VQ and xVQ at the amplifier output terminals of the second amplitude-level changing units 417 and 417x and act in a direction for controlling a decrease in the amplitudes of the horizontal transfer buses BUS and xBUS.

As it is seen from this fact, the second amplitude-level changing units 417 and 417x operate as the feedback amplifier circuit. The voltage information VQ and xVQ generated at the amplifier output terminals of the second amplitude-level changing units 417 and 417x are inputted to the gate terminals of the PMOS transistors 440 as the load transistors. Therefore, the amplitude levels of the horizontal transfer buses BUS and xBUS stabilize, in a self-aligning manner, to levels balancing with bias levels at the gate terminals of the NMOS transistors 456.

The PMOS transistors 440, which are the load transistors of the NMOS transistors 420, are used as the second level adjusting units 415 and the voltage information VQ and xVQ at the amplifier output terminals are fed back to the gate terminals of the PMOS transistors 440. Consequently, there is an advantage that the feedback amplifier circuit can be easily configured.

In this way, in the configuration according to this embodiment, as shown in FIG. 6B, the circuit includes the two horizontal transfer buses BUS and xBUS for transferring complementary output data, the NMOS transistors 420 that are distributed and arranged on the horizontal transfer buses BUS and xBUS and function as drive transistors in the respective columns for driving the horizontal transfer buses BUS and xBUS on the basis of the complementary output data, and the second amplitude-level changing units 417 (a Bus amplifying unit) 417x (a xBUS amplifying unit) as amplifying stages that are inputted with signals on the horizontal transfer buses BUS and xBUS and generate input signals (voltage information VQ and xVQ) inputted to the differential amplifying unit 418 as a differential amplifier. The circuit also includes the PMOS transistors 440 functioning as load transistors that are inputted with the voltage information VQ and xVQ generated by the second amplitude-level changing units 417 (the BUS amplifying unit) and 417x (the xBUS amplifying unit) and feed back the voltage information VQ and xVQ to the horizontal transfer buses BUS and xBUS, i.e., act in a direction for controlling the amplitudes of the horizontal transfer paths.

With such a configuration, concerning the horizontal transfer buses BUS and xBUS as data transfer paths, the PMOS transistors 440 as load transistors also function as feedback transistors. Therefore, since the amplitude of information on the horizontal transfer buses BUS and xBUS is controlled to be small, a high-speed operation is possible. The inputs of the differential amplifying unit 418 as a differential amplifier are amplified by the second amplitude-level changing unit 417 functioning as a BUS amplifying unit and the second amplitude-level changing unit 417x functioning as a xBUS amplifying unit, which are amplifying stages, to be changed to the voltage information VQ and xVQ. Therefore, it is possible to quickly and accurately compare the voltage information. Moreover, since the data are transferred as complementary information, even if noise is mixed in the horizontal transfer buses BUS and xBUS, it is possible to cancel the influence of the noise. Therefore, noise resistance is high.

<Level Control Action in the Configuration Example>

Figure 6C:
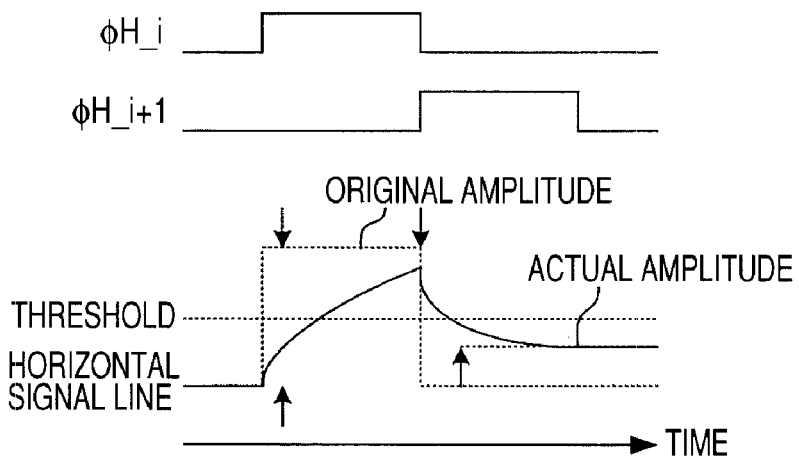
FIG. 6C is a diagram for explaining a level control action by a third level adjusting unit in the configuration example shown in FIG. 5B.
Figure 6C:
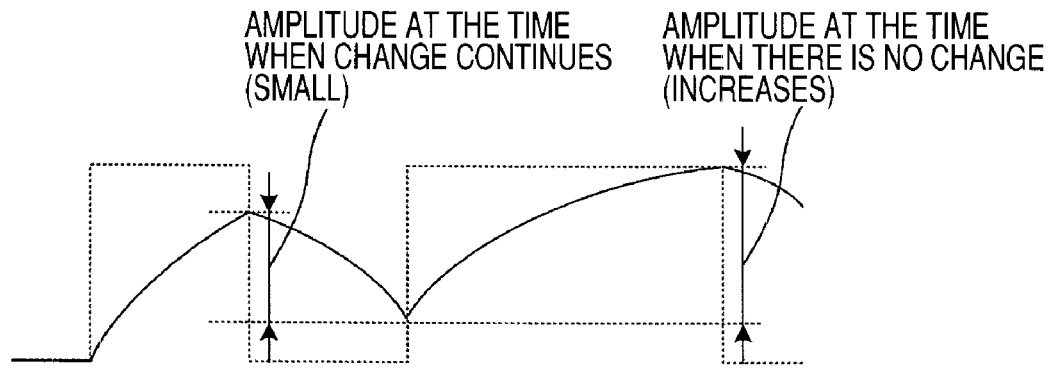
Figure 6D:
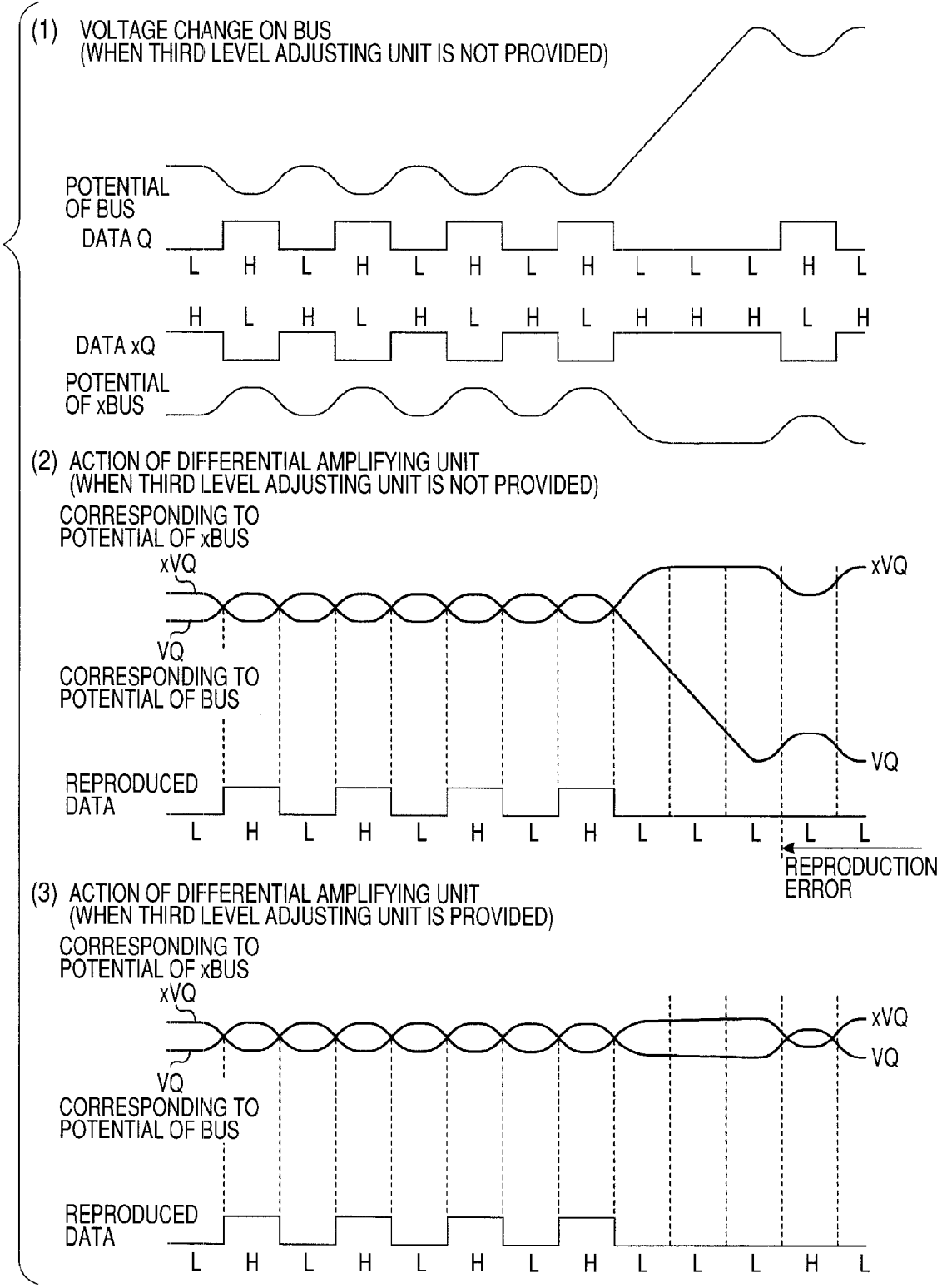
FIG. 6D is another diagram for explaining the level control action by the third level adjusting unit in the configuration example shown in FIG. 5B.

FIGS. 6C and 6D are diagrams for explaining a level control action by the third level adjusting units 416 and 417x in the configuration example shown in FIG. 5B.

When the high-load horizontal transfer buses BUS and xBUS are driven at high speed, it is difficult to secure a through rate. This is shown in FIG. 6C (1). The third level adjusting units 416 and 417x are not provided. As shown in the figure, the potentials of the horizontal transfer buses BUS and xBUS that should be amplified to the power supply voltage are actually amplified by only very small amplitude. This is because, since there is resistance in the horizontal transfer buses BUS and xBUS and there is finite output impedance in buffers (in this example, the NMOS transistors 420), the potentials are amplified by very small amplitude because of a so-called CR delay.

When the potentials are amplifies by only very small amplitude in this way, it is likely that an error in a signal occurs. This is shown in FIGS. 6C (2) and 6D (1). As shown in the figure, when outputs in columns adjacent to each other in a state in which operation points are close to the ground side are typically different and a change in the horizontal transfer buses BUS and xBUS typically occurs, the amplitude is small in the state close to the ground side and the amplitude is large when there is no change. The potential on the horizontal bus BUS continues to rise until data changes to H. However, the potential on the horizontal transfer bus xBUS stays at a predetermined level according to the action of the second amplitude-level changing unit 417.

The voltage information VQ at the amplifier output terminal of the second amplitude-level changing unit 417 functioning as the BUS amplifying unit is supplied to the non-inverting input (+) of the differential amplifying unit 418. The voltage information xVQ at the amplifier output terminal of the second amplitude-level changing unit 417x functioning as the xBUS amplifying unit is supplied to the inverting input (−) of the differential amplifying unit 418. The voltage information VQ and the voltage information xVQ are compared and amplified by the differential amplifying unit 418. Therefore, as shown in FIG. 6D (2), a threshold for reproducing data in the differential amplifying unit 418 varies because of an output change. This causes misjudgment (a reproduction error of data).

The third level adjusting units 416 and 417x are provided to solve this problem. As the third level adjusting units 416 and 417x, for example, the diode-connected NMOS transistors 422 are provided. Consequently, when the data Q and xQ are at the L level, it is possible to limit the rise of potentials for charging the horizontal transfer buses BUS and xBUS to the predetermined fifth voltage level VH5 according to the actions of the diode-connected NMOS transistors 442 and the second amplitude-level changing unit 417. In other words, when the horizontal transfer buses BUS and xBUS are not driven to the ground side by the first level-adjusting units 414 and 414x (equivalent to the time when the data Q and xQ are at the L level), the charging of the horizontal transfer buses BUS and xBUS is controlled to the fifth voltage level VH5 (≡diode voltage≡about 0.6 V). Therefore, it is possible to prevent the horizontal transfer buses BUS and xBUS from being overcharged to the power supply level.

As a result, the amplitude levels VL3 to VH4 are limited to a range of a diode voltage, the information on the horizontal transfer buses BUS and xBUS has vary small amplitude, and a high-speed inversion operation is possible. As a result, as shown in FIG. 6D (3), even when there is no change in the horizontal transfer buses BUS and xBUS, a reproduction error of data less easily occurs. To make this more complete, it is advisable to set the amplitude levels VL3 to VH4 to be substantially equal to the diode voltage. If a bias level of the NMOS transistors 456 is set such that a pull-up potential at the time when the third level adjusting units 416 and 417x are not present is equal to or higher than the diode voltage, the amplitude levels VL3 to VH4 are automatically set substantially equal to the diode voltage by the NMOS transistors 422.

The structure of the third level adjusting unit 416 that controls the potential at the pull-up time in the predetermined range (the fifth voltage level VH5) is not limited to such structure in which the NMOS transistors 442 are diode-connected. For example, it is also possible to use Zener diodes or other voltage limiting elements. However, if cathodes of diodes are connected to the ground (reference voltage) side and anodes thereof are connected to a bias line side in a forward direction, there is an advantage that a potential at pull-up time can be easily limited to a predetermined range (a diode voltage). When MOS transistors are diode-connected, it is easy to incorporate the MOS transistors in an integrated circuit.

<Relation Between an Information Reproducing Action and Bias Levels in the Configuration Example>

Figure 6E:
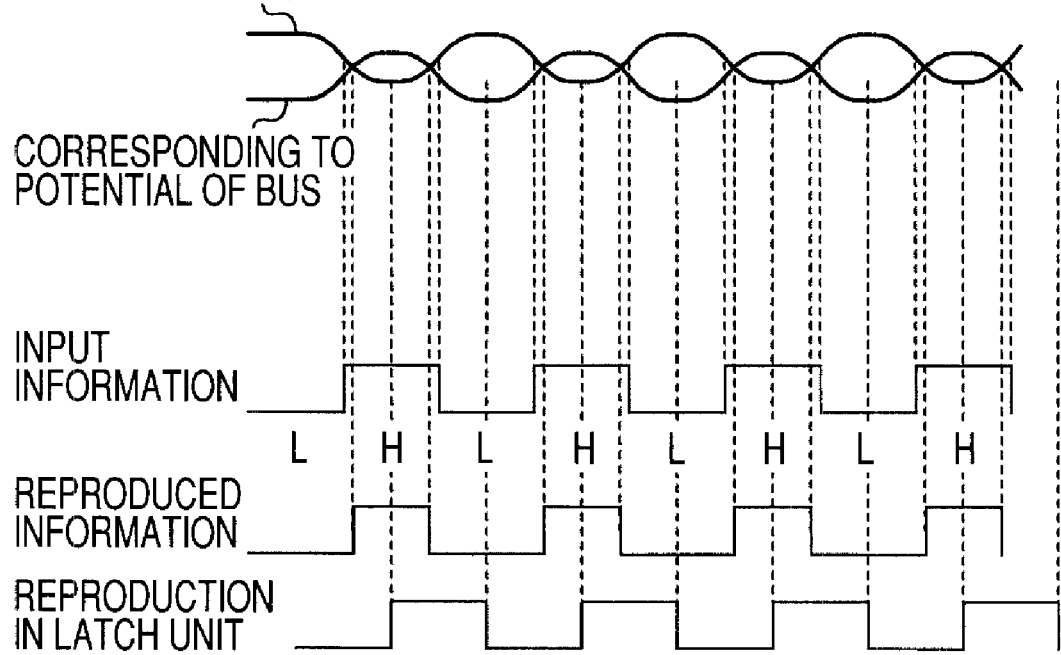
FIG. 6E is a diagram for explaining a relation between a bias level of an NMOS transistor and an information reproducing action by a differential amplifying unit in the configuration example shown in FIG. 5B.

FIG. 6E is a diagram for explaining a relation between bias levels of the NMOS transistor 464 and an information reproducing action by the differential amplifying unit 418 in the configuration example shown in FIG. 5B. An operation current of the NMOS transistor 464 substantially acts on power consumption and operation points of the second amplitude-level changing units 417 and 417x. In terms of power consumption, the power consumption can be adapted to depend on setting of a bias current generated by the bias unit 460 (a bias level to the gate terminals of the NMOS transistors 456). Therefore, it is possible to change the bias current according to transfer speed and realize low power consumption.

On the other hand, in terms of operation points, when the bias levels do not coincide with each other and an operation point at the amplifier output terminal of the second amplitude-level changing unit 417 functioning as the BUS amplifying unit and an operation point at the amplifier output terminal of the second amplitude-level changing unit 417 functioning as the xBUS amplifying unit do not coincide with each other, as shown in FIG. 6E, shift occurs between input information and reproduced information indicated by the voltage information VD reproduced by the differential amplifying unit 418. In FIG. 6E, slight shift is shown. However, when the operation points at the amplifier output terminals substantially shift, it is likely that information cannot be reproduced.

In the horizontal transfer of digital data, it is possible to improve accuracy of data reproduction by providing the latch unit 419 at the post-stage of the differential amplifying unit 418 and capturing the digital data at timing generally in the middle of a transfer cycle. However, in the case of transfer of analog information, it is difficult to improve accuracy of data reproduction in this way.

In this regard, as explained above, it is preferable to set performances of the second amplitude-level changing units 417 and 417x identical by, for example, arranging the NMOS transistor 456 on the second amplitude-level changing unit 417 side and the NMOS transistor 456 on the second amplitude-level changing unit 417x in places close to each other such that the voltage information VQ and the voltage information xVQ at the amplifier output terminals assume similar characteristics.

<Comparison with a Similar Configuration Example>

As a mechanism similar to the configuration according to this embodiment described above, for example, JP-A-5-128870 proposes, concerning a differential amplifying unit for bus signals (input and output bus signals) of a dynamic semiconductor storage device, a mechanism including means for transmitting signals on complementary bit lines selected by a column decoder to complementary bus lines, a differential amplifier that differentially inputs, compares, and judges signals on the bus lines, and a voltage-level converter (e.g., a source follower circuit) provided between the complementary bus lines and differential inputs of the differential amplifier.

By decreasing a differential input potential of the differential amplifier, that judges a difference potential of transfer paths, from a power supply voltage level using the voltage level converter, the differential amplifier of the C-MOS structure can be used in a saturated area. Therefore, it is possible to increase speed and gain of an entire amplification operation.

In the mechanism proposed in JP-A-5-128870, the voltage level converter (e.g., a source follower circuit) does not have an amplification function. Therefore, it is difficult to enjoy the actions and effects peculiar to this embodiment that, by setting an input of the differential amplifier (the differential amplifying unit 418) to a large amplitude while controlling information on the horizontal transfer buses BUS and xBUS to a small amplitude, it is possible to quickly and accurately compare voltage information by setting an input signal of the differential amplifier to a large amplitude while controlling the data paths to a small amplitude to realize high-speed transfer.

JP-A-2002-84460 proposes, in a CMOS imaging device, a mechanism that voltage-distributes an amplified output using a feedback resistor and an input resistor connected in series to obtain a voltage distributed output and uses the voltage distributed output as a differential inverted input. Information to be transferred is analog information. A negative phase signal on a negative phase signal line, which has complementarity with an image signal on a positive phase signal line for transferring a positive phase signal is generated by a differential amplifier. An amplifier gain can be set to be equal to or larger than 1. It is possible to obtain an output signal amplified at an amplification degree larger than 1 with fixed pattern noise suppressed. Therefore, noise is reduced in the mechanism.

However, in the mechanism disclosed in JP-A-2002-84460, time for stabilizing the analog information is necessary. On the other hand, in the mechanism according to this embodiment, digital information is transferred and time during which binary values can be compared only has to be retained. Therefore, the mechanism is advantageous in terms of an increase in speed.

<Imaging Apparatus>

Figure 7:
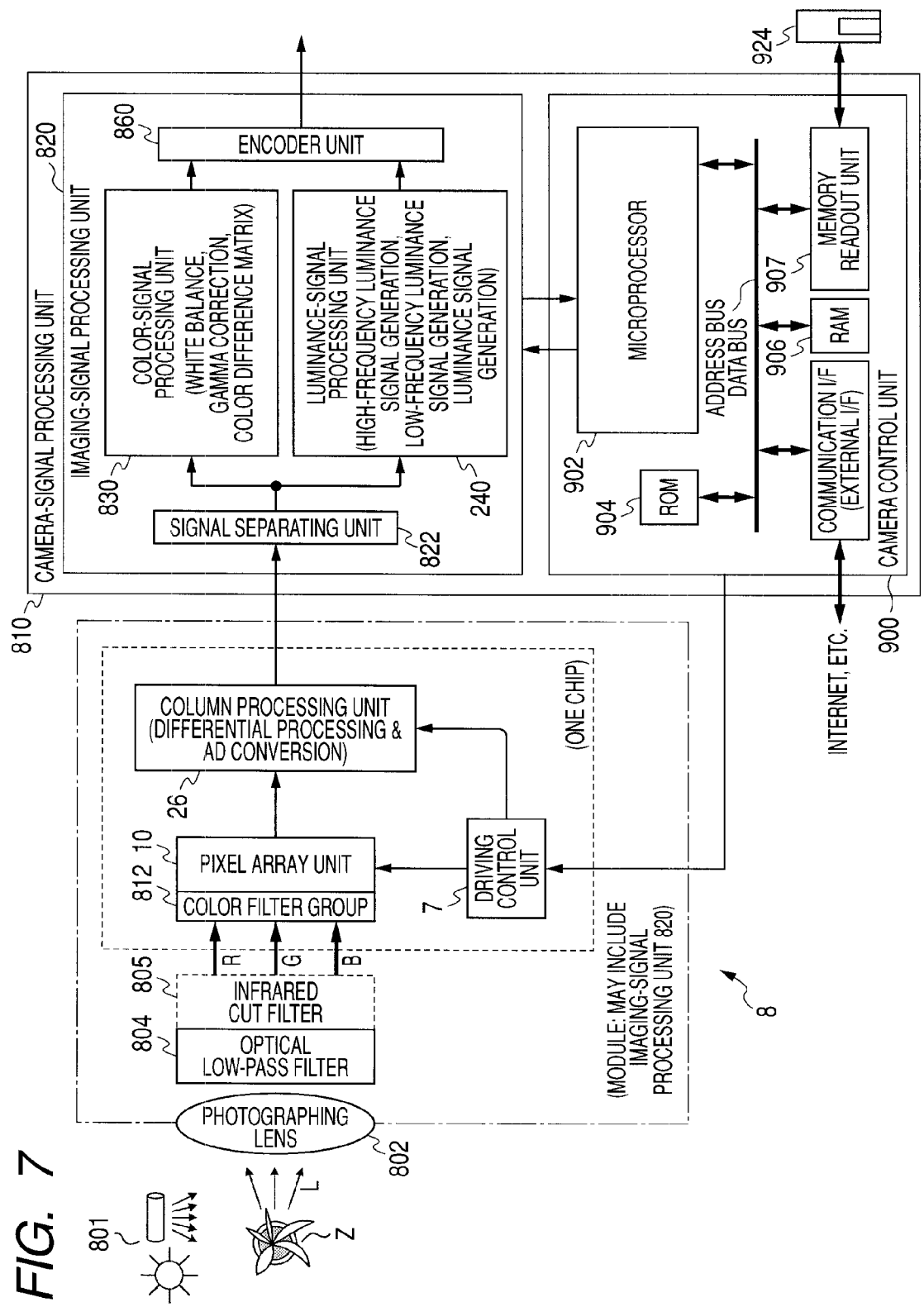
FIG. 7 is a diagram showing a schematic structure of an imaging apparatus as an example of a physical information acquiring apparatus employing a mechanism same as that of the solid-state imaging device according to the embodiment.

FIG. 7 is a diagram showing the schematic structure of an imaging apparatus (a camera system) as an example of a physical information acquiring apparatus employing a mechanism same as that of the solid-state imaging device 1 according to this embodiment. This imaging apparatus 8 is an imaging apparatus that obtains a visible light color image.

Specifically, the imaging apparatus 8 includes a photographing lens 802 that guides light L, which bears an image of a subject Z under a light source 801 such as the sun light or a fluorescent lamp, to the imaging apparatus side and focuses the light L, an optical low-pass filter 804, a color filter group 812 in which, for example, color filters of R, G, and B are arranged in a Bayer array, a pixel array unit 10, a driving control unit 7 that drives the pixel array unit 10, a column processing unit 26 that applies CDS processing, AD conversion processing, and the like to a pixel signal outputted from the pixel array unit 10, and a camera-signal processing unit 810 that processes imaging data outputted from the column processing unit 26.

The camera-signal processing unit 810 includes an imaging-signal processing unit 820 and a camera control unit 900 functioning as a main control unit that controls the entire imaging apparatus 8. The imaging-signal processing unit 820 includes a signal separating unit 822 that has a primary color separating function for separating, when a filter other than a primary color filter is used as a color filter, a digital imaging signal supplied from the column AD circuits 25b (see FIG. 1) of the column processing unit 26 into primary color signals of R (red), G (green), and B (blue) and a color-signal processing unit 830 that applies signal processing to a color signal C on the basis of the primary color signals R, G, and B separated by the signal separating unit 822.

The imaging-signal processing unit 820 also includes a luminance-signal processing unit 840 that applies signal processing to a luminance signal Y on the basis of the primary color signals R, G, and B separated by the signal separating unit 822 and an encoder unit 860 that generates a video signal VD on the basis of the luminance signal Y and the color signal C.

The camera control unit 900 according to this embodiment includes a microprocessor 902, which forms a core of a computer, represented by a CPU (Central Processing Unit) in which functions of arithmetic operations and control performed by the computer are integrated in a micro integrated circuit, a ROM (Read Only Memory) 904 that is a storing unit exclusively used for readout, a RAM (Random Access Memory) 906 in which data can be written and from which data can be read out at random and that is an example of a volatile storing unit, and other peripheral members not shown in the figure. The microprocessor 902, the ROM 904, and the RAM 906 are collectively referred to as microcomputer as well.

The "volatile storing unit" means a storing unit from which stored contents are erased when a power supply of the apparatus is turned off. On the other hand, a "nonvolatile storing unit" means a storing unit that continues to hold stored contents even if a main power supply of the apparatus is turned off. The nonvolatile storing unit only has to be capable of continuing to hold stored contents and is not limited to one in which a memory element itself made of a semiconductor has non-volatility. The nonvolatile storing unit may be a storing unit in which a volatile memory element is formed to assume "non-volatility" by providing a backup power supply.

The camera control unit 900 controls the entire system. A control program for the camera control unit 900 and the like are stored in the ROM 904. In particular, in this example, a program for setting on and off timing of various control pulses with the camera control unit 900 is stored in the ROM 904. Data and the like used by the camera control unit 900 to perform various kinds of processing are stored in the RAM 906.

A recording medium 924 such as a memory card can be detachably insertable in the camera control unit 900. The same camera control unit 900 can be connected to a communication network such as the Internet. For example, the camera control unit 900 includes, besides the microprocessor 902, the ROM 904, and the RAM 906, a memory readout unit 907 and a communication I/F (interface) 908.

The recording medium 924 is used for registering program data for causing the microprocessor 902 to perform software processing and data of various setting values such as a convergence range of photometry data DL based on a luminance system signal from the luminance-signal processing unit 840 and on and off timing of various control pulses for exposure control processing (including electronic shutter control).

The memory readout unit 907 stores (installs) data read out from the recording medium 924 in the RAM 906. The communication I/F 908 mediates exchange of communication data between the apparatus and the communication network such as the Internet.

In such an imaging apparatus 8, the driving control unit 7 and the column processing unit 26 are shown as module-like units separate from the pixel array unit 10. However, as described about the solid-state imaging apparatus 1, it goes without saying that the one-chip solid-state imaging device 1 in which these units are integrally formed on a semiconductor substrate on which the pixel array unit 10 is formed may be used.

In the figure, the imaging apparatus 8 is shown as including, besides the pixel array unit 10, the driving control unit 7, the column processing unit 26, and the camera-signal processing unit 810, optical systems such as the photographing lens 802, the optical low-pass filter 804, and an infrared cut filter 805. This form is suitable for a module-like form having an imaging function in which these units are collectively packaged.

In a relation with the module in the solid-state imaging device 1, as shown in the figure, the solid-state imaging device 1 may be provided in a module-like form having the imaging function in which the pixel array unit 10 (the imaging unit) and signal processing units (excluding the camera-signal processing unit at the post-stage of the column processing unit 26) closely related to the pixel array unit 10 side such as the column processing unit 26 having the AD conversion function and the difference (CDS) processing function are collectively packaged. The camera-signal processing unit 810, which is the remaining signal processing unit, may be provided at a post-stage of the solid-state imaging device 1, which is provided in the module-like form, to configure the entire imaging apparatus 8.

Alternatively, although not shown in the figure, the solid-state imaging device 1 may be provided in a module-like form having the imaging function in which the pixel array unit 10 and the optical systems such as the photographing lens 802 are collectively packaged. The entire imaging apparatus 8 may be configured by providing the camera 810 in the module in addition to the solid-state imaging device 1 provided in the module form.

In the module form of the solid-state imaging device 1, the camera-signal processing unit 810 may be included. In this case, practically, the solid-state imaging device 1 and the imaging apparatus 8 can be regarded identical.

Such an imaging apparatus 8 is provided as, for example, a portable apparatus having a camera and an imaging function for performing "imaging". "Imaging" includes not only capturing of images during normal camera photographing but also fingerprint detection and the like in a broader sense.

The imaging apparatus 8 having such structure has all the functions of the solid-state imaging device 1. Basic structure and operations of the imaging apparatus 8 can be set the same as those of the solid-state imaging device 1. By applying the embodiment as the data storing/transferring and outputting units 256 and the output circuit 28, it is possible to solve the problems due to a load capacitance on the horizontal signal lines 18 in the horizontal transfer.

The present invention has been explained with reference to the embodiment. However, the technical scope of the present invention is not limited to the scope described in the embodiment. Various modifications and improvements of the embodiment are possible without departing from the spirit of the invention. Forms altered and improved through such modifications and improvements are also included in the technical scope of the present invention.

The embodiment does not limit the inventions according to claims. All combinations of characteristics explained in the embodiment do not always indispensable for the solving means of the present invention. Inventions at various stages are included in the embodiment. Various inventions can be extracted by appropriate combinations of plural disclosed elements. Even if several elements are deleted from all the elements described in the embodiment, the elements from which the several elements are deleted can be extracted as inventions as long as effects are obtained.

<Application to an Electronic Apparatus>

In the examples explained above, the present invention is applied to the solid-stage imaging device and the imaging apparatus in which a pixel signal is AD-converted and horizontally transferred. However, the mechanisms of AD conversion and data transfer can be applied not only to the solid-state imaging device and the imaging apparatus but also to any kinds of electronic apparatuses that need information transfer processing such as transfer of input and output bus signals in a dynamic semiconductor storage device.

It should be understood by those skilled in the art that various modifications, combinations, sub-combinations, and alterations may occur depending on design requirements and other factors insofar as they are within the scope of the appended claims or the equivalents thereof.

What is claimed is:

1. A solid-state imaging device comprising:
    a pixel unit in which unit pixels are arrayed;
    a complementary-signal generating unit that generates two kinds of complementary signals having complementarity with each other on the basis of analog pixel signals read out from the respective unit pixels in the pixel unit;
    two kinds of complementary signal lines on which the two kinds of complementary signals are transmitted;
    a horizontal scanning unit that transfers each of the two kinds of complementary signals on the complementary signal lines;
    a differential amplifying unit that receives the signals on the two kinds of complementary signal lines with differential inputs and compares the signals; and
    a complementary-signal amplifying unit that amplifies the respective signals on the two kinds of complementary signal lines,
    wherein,
        the differential amplifying unit receives the respective signals amplified by the complementary-signal amplifying unit with differential inputs and compares the signals, and the complementary-signal amplifying unit has a feedback circuit that acts in a direction for controlling amplitudes of the signals on the complementary signal lines on the basis of the amplified signals.

2. A solid-state imaging device according to claim 1, wherein
in the pixel unit, the unit pixels are arrayed in a matrix shape, and
the solid-state imaging device further includes a vertical scanning unit that reads out analog pixel signals from the respective unit pixels in the pixel unit.

3. A solid-state imaging device according to claim 1, further comprising an AD conversion unit that converts the analog pixel signals read out from the respective unit pixels in the pixel unit into digital data, wherein
the two kinds of complementary signals are complementary bit data.

4. A solid-state imaging device according to claim 1, further comprising:
a first level adjusting unit including a driving transistor that pulls down potentials of the complementary signal lines; and
a second level adjusting unit including a load transistor that pulls up the potentials of the complementary signal lines,
wherein,
the feedback circuit supplies the amplified signals to a control input terminal of the load transistor.

5. A solid-state imaging device according to claim 4, further comprising a third level adjusting unit that controls the potentials to be pulled up in a predetermined range.

6. A solid-state imaging device according to claim 5, wherein the third level adjusting unit has a diode connected in a forward direction between the complementary signal lines and a reference voltage.

7. An imaging apparatus comprising:
a pixel unit in which unit pixels are arrayed in a matrix shape;
a vertical scanning unit that reads out analog pixel signals from the respective unit pixels in the pixel unit;
a complementary-signal generating unit that generates two kinds of complementary signals having complementarity with each other on the basis of the analog pixel signals read out from the respective unit pixels in the pixel unit;
two kinds of complementary signal lines on which the two kinds of complementary signals are transmitted;
a horizontal scanning unit that transfers each of the two kinds of complementary signals on the complementary signal lines;
a differential amplifying unit that receives the signals on the two kinds of complementary signal lines with differential inputs and compares the signals;
a main control unit that generates control information for controlling the vertical scanning unit and the horizontal scanning unit; and
a complementary-signal amplifying unit that amplifies the respective signals on the two kinds of complementary signal lines,
wherein
the differential amplifying unit receives the respective signals amplified by the complementary-signal amplifying unit with differential inputs and compares the signals, and
the complementary-signal amplifying unit has a feedback circuit that acts in a direction for controlling amplitudes of the signals on the complementary signal lines on the basis of the amplified signals.

8. An electronic apparatus comprising: two kinds of complementary signal lines on which complementary information corresponding to two kinds of complementary bit data having complementarity with each other is transmitted; a scanning unit that transfers each of the two kinds of complementary information on the complementary signal lines; a complementary-signal amplifying unit that amplifies the complementary information on the two kinds of complementary signal lines, respectively; and a differential amplifying unit that receives respective signals amplified by the complementary-signal amplifying unit with differential inputs and compares the signals, wherein, the complementary-signal amplifying unit acts in a direction for controlling signal amplitudes on the complementary signal lines on the basis of the amplified signals, and the complementary-signal amplifying unit has a feedback circuit that acts in a direction for controlling amplitudes of the signals on the complementary signal lines on the basis of the amplified signals.

9. An electronic apparatus according to claim 8, further comprising:
a first level adjusting unit including a driving transistor that pulls down potentials of the complementary signal lines; and
a second level adjusting unit including a load transistor that pulls up the potentials of the complementary signal lines, wherein
the feedback circuit supplies the amplified signals to a control input terminal of the load transistor.

10. An electronic apparatus according to claim 9, further comprising a third level adjusting unit that controls the potentials to be pulled up in a predetermined range.

11. An electronic apparatus according to claim 10, wherein the third level adjusting unit has a diode connected in a forward direction between the complementary signal lines and a reference voltage.

12. An electronic apparatus according to claim 8, further comprising a data holding unit that captures and holds information, which is outputted from the differential amplifying unit, at predetermined timing.

* * * * *